US010615610B1

(12) United States Patent
Jelinek

(10) Patent No.: US 10,615,610 B1
(45) Date of Patent: Apr. 7, 2020

(54) SYSTEM AND METHOD FOR EFFICIENT CHARGING OF MULTIPLE BATTERY CASSETTES

(71) Applicant: EKERGY LLC, Irvine, CA (US)

(72) Inventor: Howard John Jelinek, Laguna Beach, CA (US)

(73) Assignee: EKERGY LLC, Irvine, CA (US)

( * ) Notice: Subject to any disclaimer, the term of this patent is extended or adjusted under 35 U.S.C. 154(b) by 0 days.

(21) Appl. No.: 16/423,822

(22) Filed: May 28, 2019

(51) Int. Cl.
*H02J 7/00* (2006.01)
*H02J 3/38* (2006.01)
*H02J 3/32* (2006.01)

(52) U.S. Cl.
CPC .............. *H02J 7/0014* (2013.01); *H02J 3/32* (2013.01); *H02J 3/381* (2013.01); *H02J 7/0021* (2013.01)

(58) Field of Classification Search
CPC .................................................... H02J 7/0014
USPC ........................................................ 320/118
See application file for complete search history.

(56) References Cited

U.S. PATENT DOCUMENTS

| | | | |
|---|---|---|---|
| 7,196,494 B2 | 3/2007 | Baumgartner | |
| 7,683,576 B2 | 3/2010 | Tien et al. | |
| 8,164,305 B2 * | 4/2012 | Zhang | H01M 10/42 320/118 |
| 8,228,034 B2 | 6/2012 | Guatto et al. | |
| 8,463,449 B2 | 6/2013 | Sanders | |
| 8,917,061 B2 | 12/2014 | Zhu | |
| 8,963,499 B2 * | 2/2015 | Choi | H02J 7/0026 320/116 |
| 9,130,377 B2 * | 9/2015 | Barsukov | H02J 7/0021 |
| 9,136,726 B2 | 9/2015 | Shinozaki | |
| 9,293,923 B2 | 3/2016 | Kim | |
| 9,692,234 B2 | 6/2017 | Mammoli et al. | |
| 9,748,765 B2 | 8/2017 | Huang et al. | |
| 9,893,385 B1 * | 2/2018 | Nayar | H01M 10/425 |
| 9,979,211 B2 * | 5/2018 | Barsukov | H02J 7/0021 |
| 10,044,069 B2 | 8/2018 | Despesse | |
| 10,326,305 B1 | 6/2019 | Jelinek | |
| 2003/0160593 A1 * | 8/2003 | Yau | H02J 7/0018 320/116 |

(Continued)

FOREIGN PATENT DOCUMENTS

| | | |
|---|---|---|
| EP | 2 712 045 A2 | 3/2014 |
| WO | WO 2016/041422 A1 | 3/2016 |

(Continued)

OTHER PUBLICATIONS

International Search Report and Written Opinion dated Sep. 10, 2019 for International Application No. PCT/US2019/045226, 10 pages.

*Primary Examiner* — Yalkew Fantu
(74) *Attorney, Agent, or Firm* — Knobbe, Martens, Olson & Bear, LLP

(57) ABSTRACT

Systems and methods provide intelligent battery charging and balancing. Energy deficits can be forecasted based on historical data and forecasted energy generation. The deficits can be used to determine charging currents over a period of time, and battery cassettes can be charged according to the charging currents to compensate for the forecasted energy deficit. The states of charge of the battery cassettes can be periodically rebalanced. The battery cassettes can be coupled in series and charged and balanced while providing output to a load.

19 Claims, 14 Drawing Sheets

(56) References Cited

U.S. PATENT DOCUMENTS

| | | |
|---|---|---|
| 2011/0068746 A1* | 3/2011 | Rocci .................. H01M 10/441 |
| | | 320/118 |
| 2012/0126621 A1 | 5/2012 | Brownlee |
| 2013/0262197 A1 | 10/2013 | Kaulgud |
| 2014/0067151 A1 | 3/2014 | Erhart |
| 2014/0079960 A1* | 3/2014 | Yun .......................... H02J 7/34 |
| | | 429/7 |
| 2016/0226250 A1 | 8/2016 | Fukubayashi et al. |
| 2017/0170684 A1 | 6/2017 | Matthey |
| 2017/0214349 A1 | 7/2017 | Priem |
| 2018/0034285 A1 | 2/2018 | Baumgartner et al. |
| 2018/0226797 A1 | 8/2018 | Galin |
| 2018/0233914 A1 | 8/2018 | Miki |
| 2019/0036340 A1 | 1/2019 | Meeker |

FOREIGN PATENT DOCUMENTS

| | | |
|---|---|---|
| WO | WO 2017/051615 A1 | 3/2017 |
| WO | WO 2017/077716 A1 | 5/2017 |
| WO | WO 2017/163934 A1 | 9/2017 |
| WO | WO 2017/201125 A1 | 11/2017 |

* cited by examiner ified in the Application Data Sheet as
SYSTEM AND METHOD FOR EFFICIENT CHARGING OF MULTIPLE BATTERY CASSETTES

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

FIELD

This disclosure relates to battery charging technology.

BACKGROUND

Battery systems can be expensive and suffer from degraded performance over time. Some techniques for battery management may limit battery performance. Other techniques can be used to extend battery life. Battery systems can be expensive and/or suffer from efficiency losses.

SUMMARY

Some aspects feature a method for intelligently managing battery cassettes. The battery cassettes can include a plurality of batteries electrically coupled in series. The method can include: balancing a state of charge on plurality of battery cassettes that are electrically coupled in series to each other; charging the plurality of battery cassettes; and electrically coupling the plurality of battery cassettes to a load while the plurality of battery cassettes are charging and while the states of charge of the plurality of battery cassettes are balancing. The balancing can include: measuring the states of charge for each of the plurality of battery cassettes; determining actual energy deficits for each of the plurality of battery cassettes; charging a first battery cassette of the plurality of battery cassettes, wherein the first battery cassette has a first actual energy deficit that is greater than a second actual energy deficit of a second battery cassette of the plurality of battery cassettes; determining that the first actual energy deficit reaches a threshold difference from the second actual energy deficit; and stopping the charging of a cassette pair in response to the determination that the first actual energy deficit reaches a threshold difference from the second actual energy deficit. The charging of the plurality of battery cassettes can include: selecting, from among the plurality of battery cassettes, at least one selected battery cassette for charging; calculating an projected energy deficit for the selected battery cassette; determining a charging current for the selected battery cassette based at least in part on the projected energy deficit for the selected battery cassette; and charging the selected battery cassette with a current from a power grid or other source, wherein the current provided to the selected battery cassette is controlled based at least in part on the charging current.

The method can further include one, all, or any combination of the following features. For the charging of the plurality of the battery cassettes, the charging of the selected battery cassette can include charging the selected battery cassette with the grid current from the power grid and with a secondary current from a secondary power source, wherein the grid current provided to the selected battery cassette is controlled based at least in part on the charging current and the secondary current. The first battery cassette is charged from at least one of: the secondary power source, or the second battery cassette. The secondary power source can include at least one of: a solar panel, a wind turbine, a geothermal generator, fuel cell or a combustion powered generator; and the second power source is located on or adjacent to a same property as a load that draws power from the plurality of battery cassettes. The plurality of battery cassettes have charge states and voltages that are different from each other; and the plurality of battery cassettes have capacities that are different from each other. The method can further include directing an alternating current (AC) voltage to bypass a rectifier during a failsafe mode; and charging the plurality of battery cassettes can further comprise: rectifying an AC voltage from the power grid with the rectifier; and converting the AC voltage to a DC current with the voltage to current converter. Calculating the projected energy deficit for the selected battery cassette can comprise: receiving a weather forecast; accessing a predicted energy use, wherein the predicted energy use is based at least in part on a historical energy use and the weather forecast; determining a predicted quantity of secondary energy available based at least in part on the weather forecast; and calculating a difference between the predicted quantity of secondary energy available and the predicted energy use. The charging current can be kept substantially constant over at least a 12 hour period. The charging current can be determined at least in part on measuring the cassette energy deficit and at least one of: a price of grid power; a profile specifying charging currents for different voltages; and an external request to charge at a set current or power level. Charging the plurality of battery cassettes can include sequentially charging each battery cassette of the plurality of battery cassettes. The states of charge for each of the plurality of battery cassettes are measured during system operation and during times when the DC to AC converter is not drawing cassette current or drawing zero or low cassette current that is within a threshold amount.

Some aspects feature a system for intelligently managing battery cassettes, the system comprising: a plurality of battery cassettes electrically coupled in series to each other; a control system including a controller, wherein the control system can be configured to balance states of charge of the plurality of battery cassettes and to charge the plurality of battery cassettes; a secondary power source coupled to the plurality of battery cassettes; and a plurality of switches controlled by the control system to couple the plurality of battery cassettes to the power grid source. Balancing states of charge of the plurality of battery cassettes can include: measuring the states of charge for each of the plurality of battery cassettes; determining forecasted energy deficits for each of the plurality of battery cassettes; charging a first battery cassette of the plurality of battery cassettes, wherein the first battery cassette has a first energy deficit that is greater than a second energy deficit of a second battery cassette of the plurality of battery cassettes; determining that the first energy deficit reaches a threshold difference from the second energy deficit; and stopping charging the first battery cassette in response to the determination that the first energy deficit reaches a threshold difference from the second energy deficit. Charging the plurality of battery cassettes can include: selecting, from among the plurality of battery cassettes, a selected battery cassette for charging; calculating an energy deficit for the selected battery cassette; determining a charging current for the selected battery cassette based at least in part on the energy deficit for the selected battery cassette; and charging the selected battery cassette with a grid current from a power grid, wherein the grid current provided to the selected battery cassette is controlled based at least in part on the charging current. The plurality of battery cassettes can be electrically coupled to a load while the state of charge of the plurality of battery cassettes are being balanced and while the plurality of battery cassettes are charging.

The system can include one, some, or any combination of the following features. The power grid can be galvanically isolated. For the charging of the plurality of the battery cassettes, the charging of the selected battery cassette can include charging the selected battery cassette with the grid current from the power grid and with a secondary current from a secondary energy source, wherein the grid current provided to the selected battery cassette is controlled based at least in part on the charging current and the secondary current. The first battery cassette can be charged from at least one of the secondary power source or the second battery cassette. The secondary power source can include at least one of: a solar panel, a wind turbine, a geothermal generator, a fuel cell or a combustion powered generator; and the second power source can be located on a same property as a load that draws power from the plurality of battery cassettes. The plurality of battery cassettes can have voltages that are different from each other; and the plurality of battery cassettes can have capacities that are different from each other. The system can further include: a rectifier configured to rectify an alternating voltage (AC) power from the power grid; and a voltage to current converter configured to convert the AC power to the grid current, wherein the grid current is converted to a direct current; and the control system is further configured to direct the AC power to bypass the rectifier and the voltage to current converter during a failsafe mode. Calculating the energy deficit for the selected battery cassette can include: receiving a weather forecast; accessing a predicted energy use for a cassette, wherein the predicted cassette energy use is based at least in part on a historical energy use or the weather forecast; determining a predicted quantity of secondary energy available based at least in part on the weather forecast; and calculating a difference between the predicted quantity of secondary energy available and the predicted energy use. The charging current can be kept substantially constant over at least a 12 hour period. The charging current level can be determined at least in part on the energy deficit and at least one of: a price of grid power; and a profile specifying charging currents for different voltages. Charging the plurality of battery cassettes can include sequentially charging each battery cassette of the plurality of battery cassettes. The states of charge for each of the plurality of battery cassettes are measured during a time of day with below-average power usage.

Some aspects feature a method for intelligently managing battery cassettes that comprises charging a plurality of battery cassettes that are electrically coupled in series, where charging each battery cassette of the plurality of battery cassettes includes selecting, from among the plurality of battery cassettes, at least one selected battery cassette; calculating a forecasted energy deficit for the at least one selected battery cassette; determining a charging current for the at least one selected battery cassette based at least in part on the forecasted energy deficit; and charging the at least one selected battery cassette with the charging current. The method further comprises balancing states of charge of pairs of battery cassettes of the plurality of battery cassettes, each pair of battery cassettes including a first battery cassette and a second battery cassette, where the balancing includes measuring a first state of charge of the first battery cassette and a second state of charge of the second battery cassette; determining a first actual energy deficit of the first battery cassette and a second actual energy deficit of the second battery cassette, wherein the first actual energy deficit is greater than the second actual energy deficit; providing a balancing current to the first battery cassette and the second battery cassette; determining that a first balancing threshold for the second battery cassette is reached; stopping the balancing current from being provided to the second battery cassette in response to the determination that the second state of charge of the second battery cassette reaches the first balancing threshold; and providing the balancing current to the first battery cassette until the first state of charge of the first battery cassette reaches a second balancing threshold. The method further includes electrically coupling the plurality of battery cassettes to an active load during said charging the at least one selected battery cassette with the charging current and during said providing the balancing current to the first battery cassette and the second battery cassette.

In an embodiment, said charging the at least one selected battery cassette includes charging the at least one selected battery cassette with a grid current from a power grid and with a secondary current from a secondary power source, where the grid current provided to the at least one selected battery cassette is controlled based at least in part on the charging current. In an embodiment, said providing the balancing current to the first battery cassette includes providing the balancing current to the first battery cassette from at least one of a power grid, a secondary power source, or the second battery cassette. In an embodiment, the method further comprises providing energy from a secondary power source to the plurality of battery cassettes; where the forecasted energy deficit is calculated based at least in part on a forecasted amount of energy that the secondary power source will generate; the secondary power source includes at least one of a solar panel, a wind turbine, a geothermal generator, fuel cell, or a combustion powered generator; and the secondary power source is located on or adjacent to a same property as the active load that draws power from the plurality of battery cassettes. In an embodiment, the battery cassettes of the plurality of battery cassettes have voltage capacities that are different from each other; and the battery cassettes of the plurality of battery cassettes have energy capacities that are different from each other.

In an embodiment, the method further comprises directing a grid current from a power grid to bypass a rectifier and a voltage to current converter during a failsafe mode or when the plurality of battery cassettes have less than a threshold amount of total energy, where said charging the plurality of battery cassettes further comprises rectifying the grid current with the rectifier; and converting an amperage of the grid current with the voltage to current converter to be the charging current. In an embodiment, said calculating the forecasted energy deficit for the at least one selected battery cassette comprises receiving a weather forecast; accessing a predicted energy use for the at least one selected battery cassette, wherein the predicted energy use is based at least in part on the weather forecast and a historical energy use of the at least one selected battery cassette when coupled to an inverter configured to use the at least one selected battery cassette according to a modulation scheme; determining a predicted quantity of secondary energy available based at least in part on the weather forecast; and calculating a difference between the predicted quantity of secondary energy available and the predicted energy use. In an embodiment, the charging current is kept substantially constant over at least a 12 hour period; and the first actual energy deficit of the first battery cassette is determined based at least in part on a difference between an actual energy used from the first battery cassette during the at least 12 hour period and an actual energy provided to the first battery cassette during the at least 12 hour period. In an embodiment, the charging current is determined at least in part on the forecasted energy deficit and at least one of a price of grid power, a profile specifying charging currents for different voltages of a particular battery cassette, a request to charge at a specified current, or a request to charge with a specified power. In an embodiment, said charging the plurality of battery cassettes includes sequentially charging each battery cassette of the plurality of battery cassettes. In an embodiment, the first state of charge is measured during a period of time that includes one zero crossing of a sinusoidal power output signal generated based on drawing energy from the first battery cassette. In an embodiment, the first balancing threshold is a set state of charge or a set voltage, and wherein the second balancing threshold is a threshold voltage difference from a present voltage of the second battery cassette.

Some aspects feature a system for intelligently managing battery cassettes that comprises a plurality of battery cassettes coupled in series; a control system including a controller, the control system configured to control charging of the plurality of battery cassettes and balancing of states of charge of pairs of battery cassettes of the plurality of battery cassettes; and a plurality of switches controlled by the control system to selectively couple the plurality of battery cassettes to a power grid; where said charging of the plurality of battery cassettes includes selecting, from among the plurality of battery cassettes, at least one selected battery cassette; calculating a forecasted energy deficit for the at least one selected battery cassette; determining a charging current for the at least one selected battery cassette based at least in part on the forecasted energy deficit; and charging the at least one selected battery cassette with a grid current from a power grid, wherein the grid current provided is controlled based at least in part on the charging current; where each pair of battery cassettes includes a first battery cassette and a second battery cassette; and said balancing the states of charge of pairs of battery cassettes of the plurality of battery cassettes includes, for each pair of battery cassettes measuring a first state of charge of the first battery cassette and a second state of charge of the second battery cassette included in the pair of battery cassettes; determining a first actual energy deficit of the first battery cassette and a second actual energy deficit of the second battery cassette, wherein the first actual energy deficit is greater than the second actual energy deficit; providing a balancing current to the first battery cassette and the second battery cassette; determining that the second state of charge of the second battery cassette reaches a first balancing threshold; stopping the balancing current from being provided to the second battery cassette in response to the determination that the second state of charge of the second battery cassette reaches the first balancing threshold; and providing the balancing current to the first battery cassette until the first state of charge of the first battery cassette reaches a second balancing threshold; and where the plurality of battery cassettes are electrically coupled to an active load during the charging of the at least one selected battery cassette and during the providing of the balancing current to the first battery cassette and the second battery cassette.

In an embodiment, said charging of the at least one selected battery cassette includes charging the at least one selected battery cassette with the grid current from the power grid and with a secondary current from a secondary energy source, where the grid current provided to the at least one selected battery cassette is controlled based at least in part on the charging current and the secondary current. In an embodiment, during balancing, the first battery cassette is charged from at least one of: a secondary energy source or the second battery cassette. In an embodiment, the system further comprises a secondary energy source coupled to the plurality of battery cassettes, where the secondary energy source includes at least one of: a solar panel, a wind turbine, a geothermal generator, fuel cell, or a combustion powered generator; and the second energy source is located on a same or adjacent property as the active load that draws power from the plurality of battery cassettes. In an embodiment, the battery cassettes of the plurality of battery cassettes have voltage capacities that are different from each other; and the battery cassettes of the plurality of battery cassettes have energy capacities that are different from each other. In an embodiment, the system further comprises a rectifier configured to rectify the grid current; and a voltage to current converter configured to set, based at least in part on the charging current, an amperage of the grid current being provided to the plurality of battery cassettes; and where the control system is further configured to direct the grid current to bypass the rectifier and the voltage to current converter during a failsafe mode or when the plurality of battery cassettes have less than a threshold amount of total energy.

In an embodiment, calculating the forecasted energy deficit for the at least one selected battery cassette includes receiving a weather forecast; accessing a predicted energy use for the at least one selected battery cassette, wherein the predicted energy use is based at least in part on the weather forecast and a historical energy use of the at least one selected battery cassette when coupled to an inverter configured to use the at least one selected battery cassette according to a modulation scheme; determining a predicted quantity of secondary energy available based at least in part on the weather forecast; and calculating a difference between the predicted quantity of secondary energy available and the predicted energy use. In an embodiment, the charging current is determined at least in part on the forecasted energy deficit and at least one of: a price of grid power, a profile specifying charging currents for different voltages of a particular battery cassette, a request to charge at a specified current, or a request to charge with a specified power.

Some aspects feature a method to manage battery charging that comprises receiving, at a battery charging controller, a first input signal indicating battery cassette order of a plurality of battery cassettes that are electrically connected in series and a second input signal indicating degradation of each battery cassette of the plurality of battery cassettes; selecting, based on the received input signals, a battery cassette from the plurality of battery cassettes to be charged; selecting, based on the received input signals, a battery charging current; determine, based on the received input signals, a battery charging threshold; charging the selected battery cassette with the selected battery charging current until the determined battery charging threshold is met.

In an embodiment, the method further comprises receiving, at the battery charging controller, a third input signal indicating battery cassette capacity of each battery cassette of the plurality of battery cassettes. In an embodiment, the method further comprises receiving, at the battery charging controller, a third input signal indicating battery cassette voltage of each battery cassette of the plurality of battery cassettes. In an embodiment, the method further comprises receiving, at the battery charging controller, a third input signal indicating a state of charge of each battery cassette of the plurality of battery cassettes. In an embodiment, the method further comprises receiving, at the battery charging controller, a third input signal indicating battery cassette temperature of each battery cassette of the plurality of battery cassettes. In an embodiment, the method further comprises receiving, at the battery charging controller, a third input signal indicating historical energy use of each battery cassette of the plurality of battery cassettes. In an embodiment, the method further comprises receiving, at the battery charging controller, a third input signal indicating forecasted energy use. In an embodiment, the method further comprises receiving, at the battery charging controller, a third input signal indicating actual energy use of each battery cassette of the plurality of battery cassettes. In an embodiment, the battery charging threshold includes at least one of charging for a time duration, charging an amount of energy, or charging until a voltage of the selected battery cassette increases by an amount. In an embodiment, the battery charging current includes a determination according to a current to a stored voltage profile. In an embodiment, the method further comprises selecting a next battery cassette from a plurality of battery cassettes for charging when the determined battery charging threshold is met, the next battery cassette different from the selected battery cassette.

Some aspects feature a method to manage battery charging that comprises receiving, at a battery charging controller, a first input signal indicating battery cassette temperature of each battery cassette of a plurality of battery cassettes that are electrically connected in series and a second input signal indicating a battery charging profile of each battery cassette of the plurality of battery cassettes; selecting, based on the received input signals, a battery cassette from the plurality of battery cassettes to be charged; selecting, based on the received input signals, a battery charging current; determine, based on the received input signals, a battery charging threshold; charging the selected battery cassette with the selected battery charging current until the determined battery charging threshold is met.

In an embodiment, the method further comprises receiving, at the battery charging controller, a third input signal indicating battery cassette order of the plurality of battery cassettes. In an embodiment, the method further comprises receiving, at the battery charging controller, a third input signal indicating battery cassette degradation of each battery cassette of the plurality of battery cassettes. In an embodiment, the method further comprises receiving, at the battery charging controller, a third input signal indicating actual energy use of each battery cassette of the plurality of battery cassettes. In an embodiment, the method further comprises receiving, at the battery charging controller, a third input signal indicating weather forecast. In an embodiment, the method further comprises receiving, at the battery charging controller, a third input signal indicating energy forecast. In an embodiment, the method further comprises receiving, at the battery charging controller, a third input signal indicating present power demand.

In an embodiment, the method further comprises receiving, at the battery charging controller, a third input signal indicating secondary energy provided. In an embodiment, the method further comprises comprising receiving, at the battery charging controller, a third input signal indicating grid power cost. In an embodiment, the method further comprises receiving, at the battery charging controller, a third input signal indicating time and date. In an embodiment, the battery charging threshold includes at least one of charging for a time duration, charging an amount of energy, or charging until a voltage of the selected battery cassette increases by an amount. In an embodiment, the battery charging current includes a determination according to a current to a stored voltage profile. In an embodiment, the method further comprises selecting a next battery cassette from a plurality of battery cassettes for charging when the determined battery charging threshold is met, the next battery cassette different from the selected battery cassette.

Some aspects feature a method for intelligently managing battery cassettes that comprises charging a plurality of battery cassettes that are electrically coupled in series; balancing states of charge of pairs of battery cassettes of the plurality of battery cassettes, each pair of battery cassettes including a first battery cassette and a second battery cassette; and electrically coupling the plurality of battery cassettes to an active load during said charging of the plurality of battery cassettes and during balancing states of charge of the pairs of battery cassettes of the plurality of battery cassettes.

In an embodiment, said charging the plurality of battery cassettes includes selecting, from among the plurality of battery cassettes, at least one selected battery cassette; calculating a forecasted energy deficit for the at least one selected battery cassette; determining a charging current for the at least one selected battery cassette based at least in part on the forecasted energy deficit; and charging the at least one selected battery cassette with the charging current. In an embodiment, said calculating the forecasted energy deficit for the at least one selected battery cassette comprises receiving a weather forecast; accessing a predicted energy use for the at least one selected battery cassette, wherein the predicted energy use is based at least in part on the weather forecast and a historical energy use of the at least one selected battery cassette when coupled to an inverter configured to use the at least one selected battery cassette according to a modulation scheme; determining a predicted quantity of secondary energy available based at least in part on the weather forecast; and calculating a difference between the predicted quantity of secondary energy available and the predicted energy use. In an embodiment, the charging current is determined at least in part on the forecasted energy deficit and at least one of: a price of grid power, a profile specifying charging currents for different voltages of a particular battery cassette, a request to charge at a specified current, or a request to charge with a specified power. In an embodiment, said charging the at least one selected battery cassette includes charging the at least one selected battery cassette with a grid current from a power grid and with a secondary current from a secondary power source, wherein the grid current provided to the at least one selected battery cassette is controlled based at least in part on the charging current.

In an embodiment, the method further comprises directing a grid current from a power grid to bypass a rectifier and a voltage to current converter during a failsafe mode or when the plurality of battery cassettes have less than a threshold amount of total energy; where said charging the plurality of battery cassettes further comprises rectifying the grid current with the rectifier; and converting an amperage of the grid current with the voltage to current converter to be the charging current. In an embodiment, the method further comprises providing energy from a secondary power source to the plurality of battery cassettes; wherein the forecasted energy deficit is calculated based at least in part on a forecasted amount of energy that the secondary power source will generate; where the secondary power source includes at least one of: a solar panel, a wind turbine, a geothermal generator, fuel cell, or a combustion powered generator; and the secondary power source is located on or adjacent to a same property as the active load that draws power from the plurality of battery cassettes. In an embodiment, said balancing states of charge of pairs of battery cassettes includes measuring a first state of charge of the first battery cassette and a second state of charge of the second battery cassette; determining a first actual energy deficit of the first battery cassette and a second actual energy deficit of the second battery cassette, wherein the first actual energy deficit is greater than the second actual energy deficit; providing a balancing current to the first battery cassette and the second battery cassette; determining that a first balancing threshold for the second battery cassette is reached; stopping the balancing current from being provided to the second battery cassette in response to the determination that the second state of charge of the second battery cassette reaches the first balancing threshold; and providing the balancing current to the first battery cassette until the first state of charge of the first battery cassette reaches a second balancing threshold.

In an embodiment, said providing the balancing current to the first battery cassette includes providing the balancing current to the first battery cassette from at least one of: a power grid, a secondary power source, or the second battery cassette. In an embodiment, a charging current is kept substantially constant over at least a 12 hour period; and the first actual energy deficit of the first battery cassette is determined based at least in part on a difference between an actual energy used from the first battery cassette during the at least 12 hour period and an actual energy provided to the first battery cassette during the at least 12 hour period. In an embodiment, the first state of charge is measured during a period of time that includes one zero crossing of a sinusoidal power output signal generated based on drawing energy from the first battery cassette. In an embodiment, the first balancing threshold is a set state of charge or a set voltage; and the second balancing threshold is a threshold voltage difference from a present voltage of the second battery cassette. In an embodiment, the battery cassettes of the plurality of battery cassettes have voltage capacities that are different from each other, and the battery cassettes of the plurality of battery cassettes have energy capacities that are different from each other. In an embodiment, charging the plurality of battery cassettes includes sequentially charging each battery cassette of the plurality of battery cassettes.

Some aspects feature a system for intelligently managing battery cassettes that comprises a plurality of battery cassettes coupled in series; a control system including a controller, the control system configured to control charging of the plurality of battery cassettes and balancing of states of charge of pairs of battery cassettes of the plurality of battery cassettes; and a plurality of switches controlled by the control system to selectively couple the plurality of battery cassettes to a power grid; where the plurality of battery cassettes are electrically coupled to an active load during charging of the plurality of battery cassettes and during balancing states of charge of pairs of battery cassettes of the plurality of battery cassettes.

In an embodiment, the control system is further configured to charge the plurality of battery cassettes by selecting, from among the plurality of battery cassettes, at least one selected battery cassette; calculating a forecasted energy deficit for the at least one selected battery cassette; determining a charging current for the at least one selected battery cassette based at least in part on the forecasted energy deficit; and charging the at least one selected battery cassette with a grid current from a power grid, wherein the grid current provided is controlled based at least in part on the charging current. In an embodiment, each pair of battery cassettes includes a first battery cassette and a second battery cassette; and where the control system is further configured to balance the states of charge of pairs of battery cassettes of the plurality of battery cassettes by, for each pair of battery cassettes measuring a first state of charge of the first battery cassette and a second state of charge of the second battery cassette included in the pair of battery cassettes; determining a first actual energy deficit of the first battery cassette and a second actual energy deficit of the second battery cassette, wherein the first actual energy deficit is greater than the second actual energy deficit; providing a balancing current to the first battery cassette and the second battery cassette; determining that the second state of charge of the second battery cassette reaches a first balancing threshold; stopping the balancing current from being provided to the second battery cassette in response to the determination that the second state of charge of the second battery cassette reaches the first balancing threshold; and providing the balancing current to the first battery cassette until the first state of charge of the first battery cassette reaches a second balancing threshold.

Some aspects feature an apparatus to intelligently manage battery cassettes that comprises a plurality of battery cassettes electrically connected in series, the plurality of battery cassettes forming pairs of battery cassettes; a switching circuit comprising a plurality of first switches, each first switch of the plurality of first switches associated with a respective battery cassette of the plurality of battery cassettes and in electrical communication with a positive terminal of the respective battery cassette; and a battery charging controller in electrical communication with the plurality of first switches to provide charging current to each battery cassette via the respective first switch, the battery charging controller providing control signals to control a state of the plurality of first switches, the battery charging controller comprising one or more processors programmed to execute instructions that cause at least one processor of the one or more processors to close the first switches associated with a first battery cassette and a second battery cassette of a first pair of battery cassettes; determine that the first battery cassette of the first pair has reached a battery charging threshold and that the second battery cassette of the pair has not reached the charging threshold; and open the first switch associated with the first battery cassette to continue to charge the second battery cassette until the second battery reaches the charging threshold to balance charges of the first battery cassette and the second battery cassette.

In an embodiment, the switching circuit further comprises a plurality of second switches, each second switch of the plurality of second switches associated with a respective pair of battery cassettes and in electrical communication with a negative terminal of the respective pair of battery cassettes. In an embodiment, the battery charging controller further provides the control signals to control a state of the plurality of second switches, the battery charging controller comprising the one or more processors programmed to execute instructions that further cause the at least one processor of the one or more processors to close the second switch associated with the first pair of battery cassettes to charge the first and second battery cassettes of the first pair of battery cassettes. In an embodiment, the apparatus further comprises a plurality of voltage sensors, each voltage sensor of the plurality of voltage sensors associated with the respective battery cassette to determine a state of charge of the respective battery cassette. In an embodiment, the state of charge is used to determine energy deficits of the respective battery cassette. In an embodiment, the state of charge is used to determine whether to rebalance each respective battery cassette. In an embodiment, the state of charge is used to log historical energy use. In an embodiment, the apparatus further comprises at least one temperature sensor to measure a temperature of each respective battery cassette. In an embodiment, the battery charging controller interrupts charging of each respective battery cassette based on the measured temperature of each respective battery cassette.

DETAILED DESCRIPTION

Introduction

Figure 1:
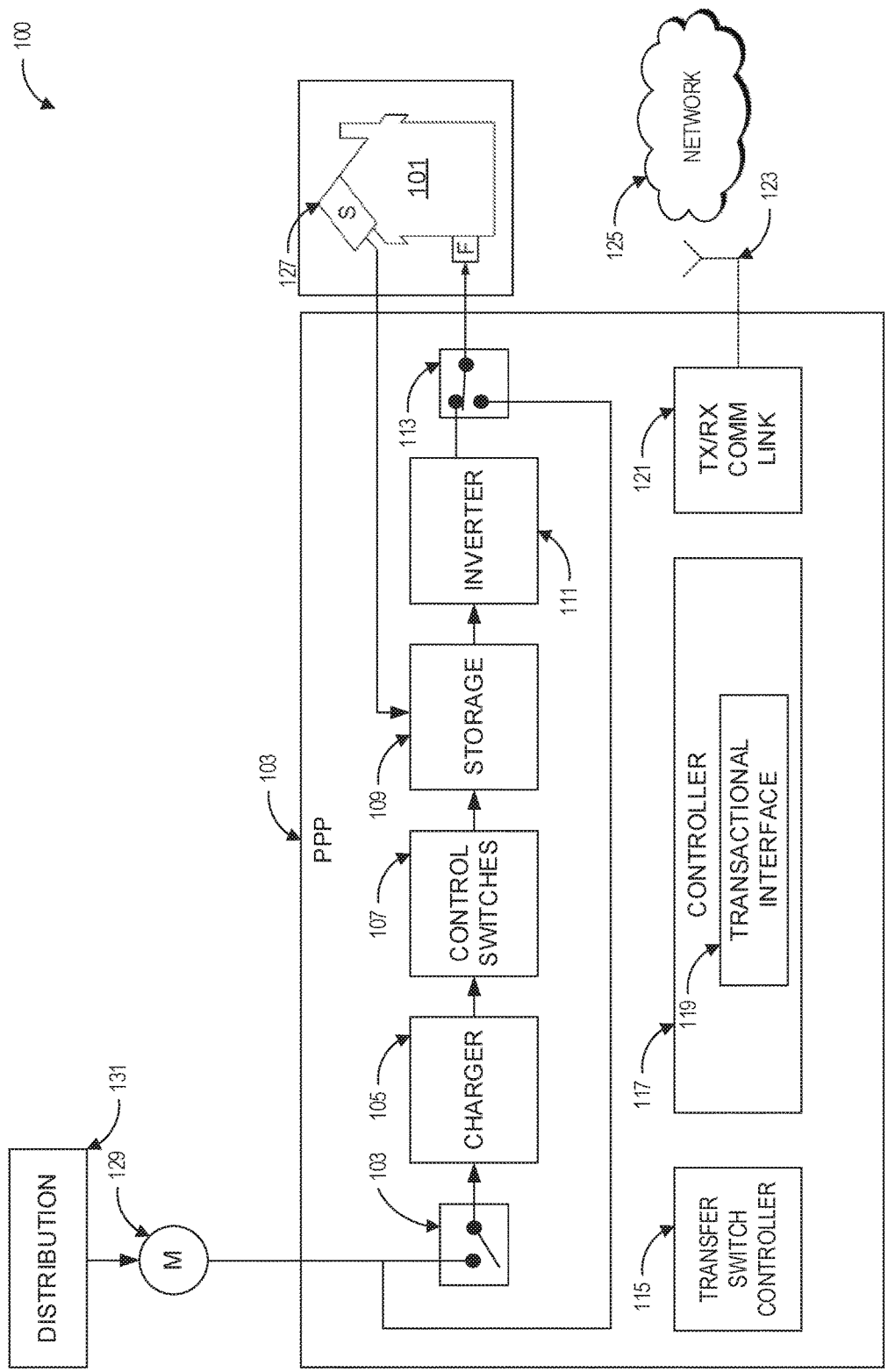
FIG. 1 is a block diagram 100 illustrating a residence having a personal power plant (PPP) with alternate electrical energy generation integration according to certain embodiments.

Distributed energy storage and generation, which has been defined in a number of ways and implemented and/or supported as "grid enhancement features," can be used to ensure reliable electrical power delivery. Working in conjunction with the grid or located off-grid, a personal power plant (PPP) can be configured to provide on-demand and distributed residential scale AC electricity from stored energy. PPP customer locations can be residential homes or small, commercial locations that consume, for example, between approximately 10 and approximately 48 kilowatt hours (kWh) of electrical energy per day. Unlike grid side distributed storage and generation, which are typically located at substations or at wind and solar farm generation sites, the PPP can be located on the residential or small, commercial load site.

The PPP can be configured to integrate electrochemical storage batteries with an electronics subsystem to provide battery charge management and on demand AC power. Batteries store the energy obtained from traditional and non-traditional sources for later use. The energy that is stored can be delivered from the energy grid, generated by non-traditional energy sources, such as fuel cells, solar cells, wind turbines, geothermal sources, and the like and/or any device that can produce either alternating current (AC) or direct current (DC) current/energy. Energy stored is typically converted from one form—potential, kinetic mechanical, and/or radiation—to electrical DC voltage. In some embodiments, the storage typically can include one or more 24 or 48-volt batteries connected in series.

In some embodiments, the PPP can be configured to employ power electronics for battery charging and AC generation and run management software that links operation to the smart grid through the Internet of Things. The PPP can include electronic modules that manage storage and efficiently convert the stored DC energy from the batteries to generate on-demand residential scale AC electricity. The PPP can further include a system controller to manage battery charging and to monitor and control system operation. The system controller can also provide cloud access and communication to manage battery charging. For example, in some embodiments, the system controller can be configured to access and manage system current, voltage, and wattage measurements and provide a variable-time record that is used locally and may be viewed via the cloud.

In some aspects, the energy storage capacity of the batteries, measured in kWh, can be approximately the same as an average daily load. This storage capacity can be increased or decreased. Higher storage capacities can support higher levels of performance, e.g. blackout protection, off grid operation, etc., while lower capacity can reduce system cost and support lower sustained power output duration time in the event that all energy sources are 'interrupted'. The PPP system can be configured to generate whole house on demand power. In California, average daily residential electricity consumption can be approximately 24-32 kWh. In some embodiments, the storage capacity of the batteries for better cost-performance can be in the approximately 24-32 kWh range.

In some aspects, the storage capacity of the batteries can be sufficient to store at least enough energy to generate sustained on-demand residential power for approximately the next 24 hours, and the system controller can be configured to control battery charging to ensure that there is sufficient energy stored in the batteries to generate the on-demand power for approximately the next 24 hours, even if all energy sources are lost or interrupted, such as occurs during storms, fires, or earthquakes.

Aspects of the PPP can be configured to provide alternative power source integration, such as for solar, wind, etc. Unlike grid tied solar that employs net metering, approximately all power generated by the PPP is used by the load. Energy from the grid or other energy sources is stored on an as-needed or 'pre-calculated' basis and delivered at a rate determined by the system computer. Energy from intermittent sources can be stored as it is generated. Energy from the grid or other energy sources can be used to 'top up' the battery storage. To manage variability, unpredictability and intermittency of solar, the system controller, interoperating with the Internet, can be configured to project the expected next 24-hours of on-site solar insolation and from this, determine how much solar and wind energy will be stored and available and predict how much managed energy from the electrical grid, if any, will need to be added to storage to ensure continuous operation. The management software in the system controller can be configured to determine how much additional managed energy to add based on projected demand. For example, if the projected insolation for 4 kW of solar photo voltaic (PV) operating for a period of 6-8 hours over the next 24 hours produces 24 kWh of energy and if the projected demand is 26 kilowatt hours, then the system will add 2 kWh of (grid) energy over the next 24 hours. The PPP system can be configured to purchase the 2 kWh of energy at a time when the rate is low.

In other aspects, the PPP can be configured to provide a transactional benefit by providing demand response/grid management (i.e., load shedding, load leveling, peak shaving, etc.) The PPP can be remotely programmed and commanded to 'draw' specified amounts of grid energy over a specific period. An aspect of at least some of the innovations disclosed herein includes the realization that such PPPs can also be configured to increase or decrease grid demand in response to requests from the energy distributor, such as an electrical utility. This capability can be made independent of the load site demand at each location.

The residential electricity market in the United States is approximately 100 million homes. Residential electricity use amounts to over 35% of the total electricity market. The remainder is made up of commercial and industrial demand. Distributed storage using the PPP disclosed herein can include the optional additional benefits of reducing power demand levels for grid generated electricity. This lower level of power demand can result in decreasing distribution losses. If the majority of energy used by the PPP is from solar and wind, the generation of carbon products can be reduced commensurately. The PPP can also provide the additional, optional capability for consumer participation in grid management/demand response.

Green home builders, micro grids, and cooperatively owned utilities can all benefit directly from PPP technology. Home owners with onsite solar and wind can benefit financially and directly from the reduction in monthly electricity bills and by the capability to maintain their electricity supply in the event of grid faults and catastrophic grid failure. Utilities can benefit by directly utilizing PPP networks for storage and grid management and society can benefit indirectly by the replacing up to 40% of all electrical energy generated from fossil fuels used by the existing generation stations.

In summary, distributed generation and storage, located at the residential load site has the promise of greatly enhancing electricity supply security and reliability. Because the residential owners typically have available roof space for mounting PV and for locating storage at no additional cost, and because distribution losses are minimized, the PPP solution can be a cost effective, efficient, green, and secure solution for 24/7 consumer level power delivery.

The PPP according to some embodiments, can be configured to provide any one or any combination of the following benefits:

Fixing the cost/price of a residential kilowatt hour;
Removing the effects of intermittent solar/wind from the grid;
Reducing grid capacity requirements;
Reducing grid transmission losses;
Helping stabilize grid load;
Producing carbon free electricity;
Utilizing fossil-free fuel;
Reducing/eliminating grid distribution infrastructure upgrades;
Improving environmental aesthetics by reducing or eliminating distribution wires and poles;
Reducing/eliminating the need for centralized wind and solar farm storage to utilize renewable solar and wind; and
Reducing/eliminating the need for new fossil fuel generation.

Personal Power Plant (PPP)

FIG. 1 is a block diagram 100 illustrating a residence 101 having an embodiment of a personal power plant (PPP) 103 with alternate electrical energy generation integration. The illustrated PPP 103 can include a switch 103, charger 105, control switches 107, an energy storage device 109, an inverter 111, a switch 113, a transfer switch controller 115, a controller 117, a transactional interface 119, and a transmit/receive (RX/TX) wireless link 121 in communication with an antenna 123. The PPP 103 can include a wireless communication unit configured to support wireless communication with a network 125, such as the Internet. The PPP 103 can receive power through a power distribution system 131, such as a power grid. An electricity meter 129 can measure power distributed between the distribution system 131 and the personal power plant 103. Secondary power sources 127, such as a solar panel, can provide power to the PPP 103. The PPP 103 can be configured to provide power to the fuse box "F" or circuit breaker of the residence 101.

The battery storage 109 can be configured to store electrical energy for use by the residence 101. In some embodiments, the battery storage 109 can store at least enough electrical energy to supply the residence 101 with electricity for a 24-hour period or other period of time. In certain embodiments, the battery storage 109 can include electrochemical storage batteries. In some embodiments, the electrochemical storage batteries can include one or more 48-volt batteries connected in series. In some embodiments, the battery storage 109 can include a plurality of battery cassettes coupled to each other in series, each battery cassette of the plurality of battery cassettes can include a plurality of batteries coupled in series.

Figure 2:
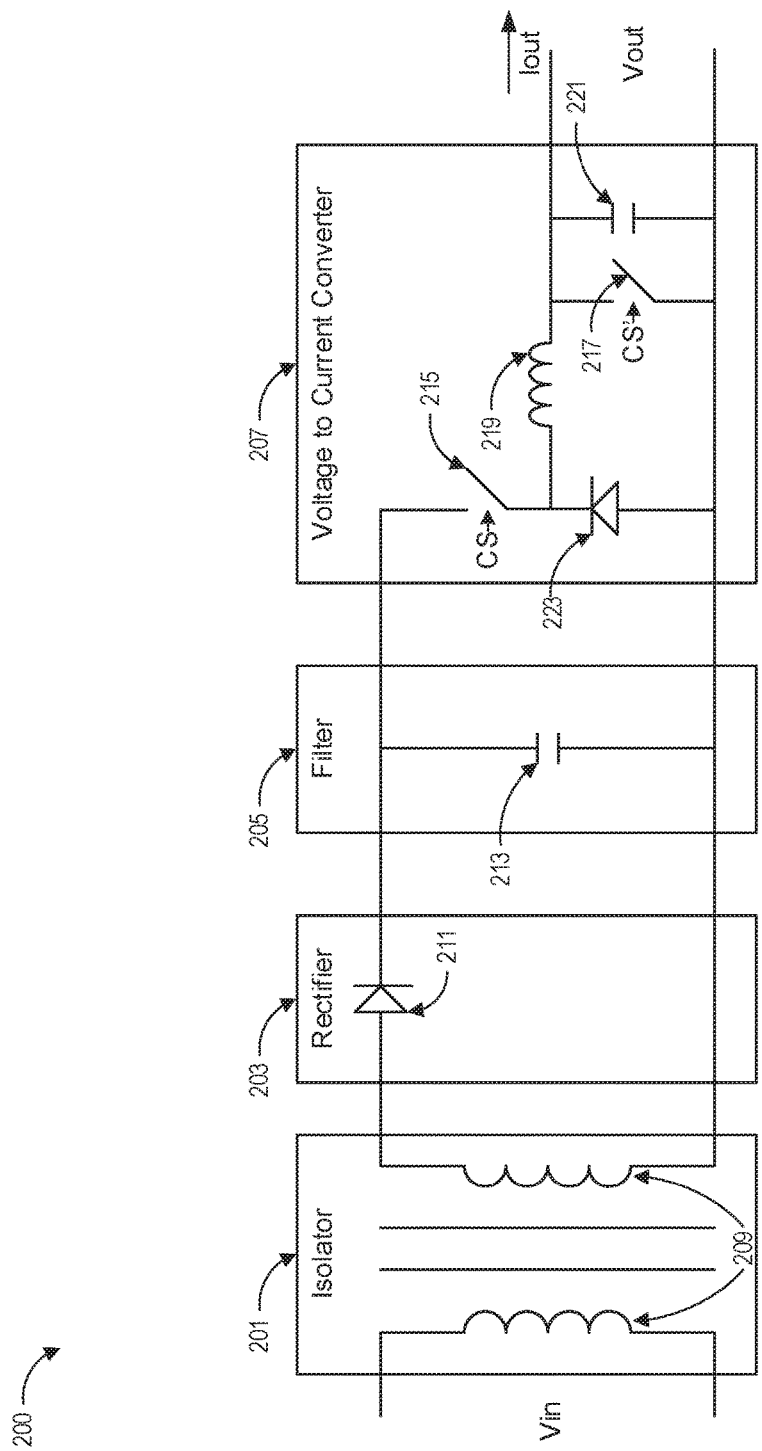
FIG. 2 is a block diagram illustrating a charger according to certain embodiments.

The charger 105 can be configured to charge the battery storage 109 using electrical energy provided by the distribution system 131. The battery storage 109 can additionally or alternatively be charged using electrical energy generated locally at the residence from the secondary power source 127. Examples of secondary power sources 127 include but are not limited to gas generators, microgrids, wind turbines, solar arrays, and fuel cells. An example charger 105 is shown in FIG. 2.

The inverter 111 can be configured to convert the stored energy from the battery storage 109 into AC electrical energy for use by the residence.

The TX/RX wireless link 121 and the antenna 123 can be configured to transmit and receive messages via a network 125, such as the Internet. In some embodiments, the TX/RX wireless link 121 and the antenna 123 can be replaced with a digital network communication device configured for internet access over land lines.

The transfer switch controller 115 can be configured to transfer the residential load to the distribution system 131 in the event the PPP 103 fails. The transfer switch controller can be configured to control the switches 103 and 113. The switches 103 and 113 can, in some embodiments, be a single pole double throw switch or relay. In the normally closed position, the switch 103 can electrically couple the charger 105 to the power distribution system 131. Switch 113 can normally permit the output of the inverter 111 to electrically connect with the residential load to supply electrical energy from the PPP 103 to the residential load. When switch 103 is opened and switch 113 is toggled, the PPP 103 can be electrically disconnected from the residential load and the residential load can be electrically connected or "transferred" to the distribution system 131 such that the electrical grid provides the electrical energy to the residential load 101. Accordingly, the charger 105, control switches 107, storage 109, and inverter 111 can be bypassed or uncoupled. This can occur, for example, during a failsafe mode, when the storage 109 is out of energy, or when the storage 109 has less than a threshold amount of energy. In some embodiments, the switch 103 can be closed while switch 113 couples the residential load 101 to the distribution network 131 such that current is provided from the distribution network 131 to both charge the storage devices 109 and to power the residential load 101, bypassing the inverter 111.

The control switches 107 can be configured to disconnect and reconnect the battery storage 109 from the distribution system 131 while the switch 103 couples the charger 105 to the distribution system 131 and while the switch 113 couples the residence to the inverter 111. For example, the control switches 107 can be configured to disconnect the charger 105 from the distribution system 131 such that the PPP 103 supplies electrical power from the battery storage 109 to the residence 101 for any period of time, for example, for a 24-hour period without receiving electrical power from the distribution system 131. In other words, the residence can "island" when the charger control switch 107 disconnects the PPP 103 from the electrical grid 100.

The controller 117 can include computer hardware and can communicate with the TX/RX wireless link 121 to send data and status and receive commands via antenna 123. The controller 117 can be configured to control the control switches 107. In some embodiments, the controller 117 can be configured to control the control switches 107 based at least in part on commands received from the distribution system 131. Further, the controller 117 can be configured to control the charger 105 and the inverter 111. The controller 105 can be configured to receive status information from the battery storage 109, such as the status, the charged capacity, and/or the temperature of the battery cassettes and/or batteries.

In some embodiments, the transactional interface 119 can be configured to determine the least expensive times of day to charge the battery storage 109 from the distribution system 131. For example, the controller 117 can be configured to request and receive via the TX/RX wireless link 121 the rate schedule from the distribution system 131. A time of use (TOU) rate schedule may define different electric rates for different time periods. For example, on-peak time periods having on-peak rates may be 1:00 PM to 5:00 PM summer weekdays, except holidays; mid-peak time periods having mid-peak rates may be 8:00 AM to 1:00 PM and 5:00 PM to 10:00 PM for summer weekdays and 7:00 AM to 9:00 PM for winter weekdays, except holidays; and off-peak time periods having off-peak rates may be all other hours. The on-peak rates are higher than the mid-peak and off-peak rates, and the mid-peak rates are higher than the off-peak rates. Using the TOU rate schedule, the transactional interface 119 can be configured by the controller 117 to determine when to charge the battery storage 109 to incur the least expensive electric rates, such as for example, during the off-peak time periods.

Further, the transactional interface 119 can be configured to accept or decline incentives from the distribution system 131 to island the residence during period of heavy power usage on the electrical grid 100. Some utilities have developed transactional software to predict generation requirements based on the current demand. The utilities typically respond by adding or reducing generation. In this case, the PPP transactional interface 119 can be configured to provide "equivalent functionality" when coupled to the utility generation management system maintained and used by the distribution company. This transactional or information exchange can enable a utility during a peak demand period to redirect power it normally generates to other users, and not to participating PPPs, rather than obtaining the energy from other sources, such as back-up generators or energy exchanges. The transactional relationship as to the PPPs can be based on the information on use and need in their respective controllers, which can be relevant for communicating with the utility when it has a need for excess power to meet a spike in demand.

FIG. 2 is a block diagram 200 illustrating an embodiment of a charger. The block diagram can be used, for example, as the charger 105 of FIG. 1. FIG. 2 shows an isolator 201, a rectifier 203, a filter 205, and a voltage to current converter 207.

The isolator 201 can be configured to provide electrical isolation between an AC power source (such as the power grid, a high voltage source, high current source, or high power source) and other circuitry (such as the control switches 107, battery storage 109, inverter 111, load 101, or other parts of the charger 105). The isolator 201 can be configured to include two inductor coils 209 electromagnetically coupled to each other such that a current flowing through a first coil induces a current through the other coil. Other types of isolators can be used.

The rectifier 203 can be configured to rectify an AC current, such as AC power induced from the grid through the isolator. The illustrated rectifier 203 can include a diode 211. Other types of rectifiers, such as half bridge rectifiers or full bridge rectifiers, can also be used.

A filter 205 can receive the output of the rectifier. The illustrated filter 205 can include a smoothing capacitor 213 that can be configured to smooth out the AC current to provide a substantially DC output. Other types of smoothing filters can also be used.

The voltage to current converter 207 can receive the DC output voltage from the filter 205 and can generate a variable DC output current. The illustrated voltage to current converter can include a switch 215, a switch 217, an inductor 219, an output capacitor 221, and a diode 223. One of the switches 215, 217 can be closed while the other of the switches 215, 217 can be open. The amperage of the DC output current can be based on the voltage of the DC input signal. The amperage of the DC output current can also be based on timings of switches 215, 217, such as a duty cycle or switching speed. Control signals CS, CS' can be configured to cause the switches 215, 217 to open and close at various timings and frequencies to control an amount of current provided at the output. Other types of controllable voltage to current converters, including DC to DC converters, can also be used. The switches 215, 217 of the voltage to current converter 207 can be modulated to maintain an output voltage Vout greater than or equal to a voltage of a battery cassette to be charged.

Figure 3A:
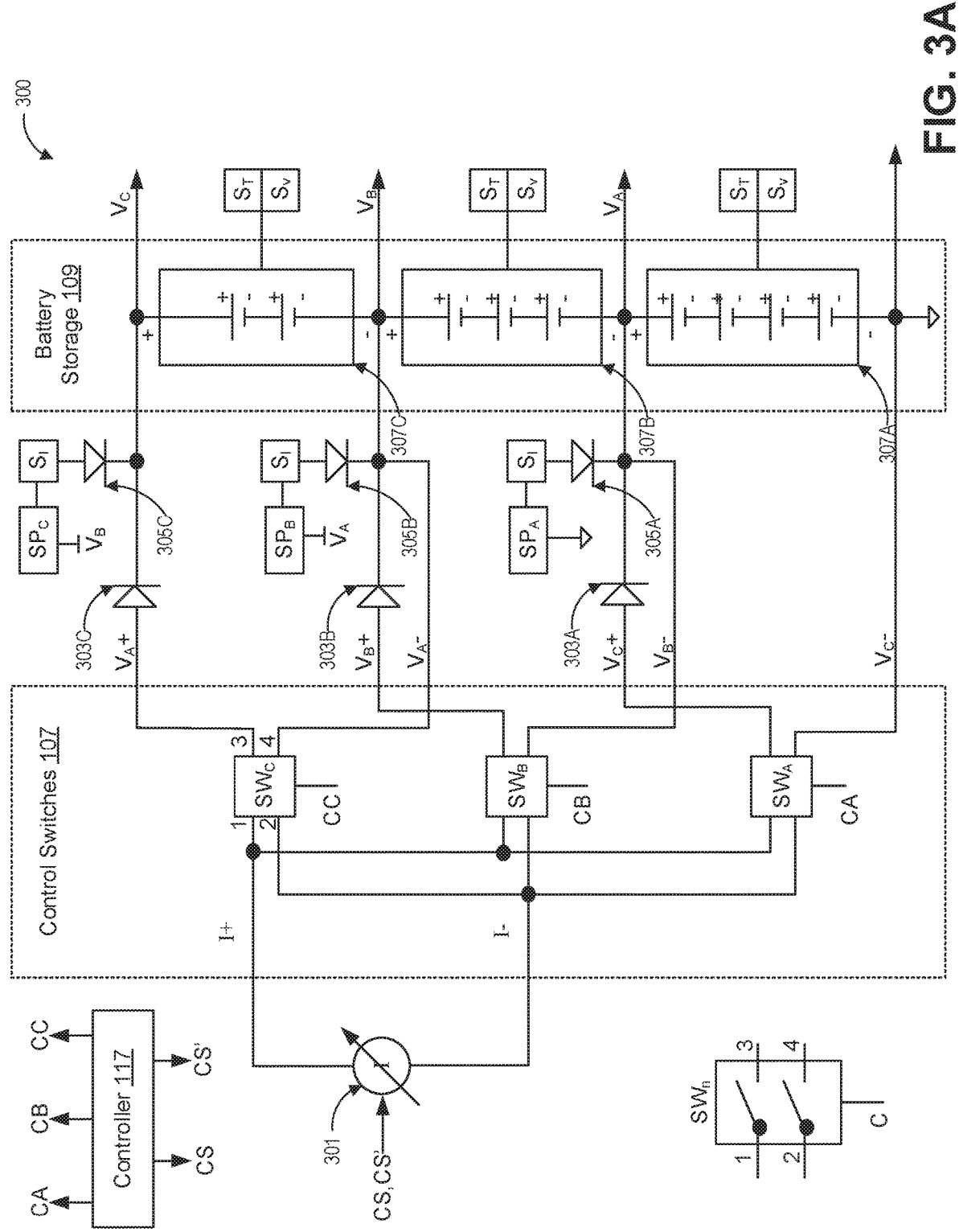
FIG. 3A is a block diagram of a battery charging system according to certain embodiments.

FIG. 3A is a block diagram 300 of a battery charging system according to certain embodiments. The battery charging system can include a variable current source 301, control switches 107, battery storage 109, a controller 117, diodes 303A-303C, diodes 305A-305C, solar panels $SP_A$-$SP_C$, current sensors $S_I$, temperatures sensors $S_T$, and voltage sensors $S_V$. The control switches 107 include a plurality of switch pairs $SW_A$-$SW_C$, each of which can have a structure shown by $SW_n$. The battery storage 109 can include battery cassettes 307A-307C coupled in series, and each battery cassette 307A-307C can include a plurality of batteries coupled in series. Although three switch pairs $SW_A$-$SW_C$ and three battery cassettes 307A-307C with two, three, and four batteries are illustrated, the technology disclosed herein can be extended to include any number of switch pairs and any number of battery cassettes with any number of batteries.

The variable current source 301 can be configured to provide a variable amount of current to the battery storage 109. The variable current source 301 can be electromagnetically coupled to receive power from the grid and electrically isolated from the grid, for example as shown in FIG. 2. The amount of current output by the variable current source 301 can be controlled by control signals CS and CS'.

The control switches 107 can include a plurality of switch pairs $SW_n$. The control switches 107 can include a respective switch pair $SW_n$ for each battery cassette 307A-307C in the battery storage 109. For each of the switch pairs $SW_A$-$SW_C$, a first input 1 to a first switch is coupled to a positive I+ terminal of the variable current source 301, and a second input 2 to a second switch is coupled to a negative terminal I− of the variable current source 301. For each of the respective switch pairs $SW_A$-$SW_C$, an output 3 of the first switch can be coupled to a positive terminal of a respective battery cassette, and an output 4 of the second switch can be coupled to a negative terminal of the respective battery cassette. The control switches can be controlled by a respective control signal CA, CB, or CC generated by the controller 117. In response to the respective control signal, the first and second switches in a switch pair $SW_A$-$SW_C$ can close to complete a circuit to deliver current to a respective battery cassette 307A-307C. In various embodiments, the first and second switches in the switch pairs $SW_n$ can be physically moving relays, power transistors, or other types of switches.

In some embodiments, the variable current source 301 can be configured to have an output voltage to charge one of the battery cassettes 307A-307C at a time. Accordingly, the variable current source 301 can have an output voltage that is greater a voltage of a battery cassette being charged. The variable current source 301 can also have a voltage output that is less than a voltage of some or all of the plurality of battery cassettes 307A-307C coupled in series. Accordingly, the variable current source 301 can be configured for a specific voltage output or smaller voltage output range than variable current sources configured to charge the entire series of the plurality of battery cassettes 307A-307C.

The battery storage 109 can include a plurality of battery cassettes 307A-307C that are coupled in series. A voltage output can be taken across any of the battery cassettes at the voltage nodes $V_A$, $V_B$, or $V_C$. The battery cassettes 307A-307C can be configured to be charged from the grid when the controller 117 configures the respective switch pair $SW_A$-$SW_C$ to direct current from the grid to the respective battery cassette 307A-307C. The diodes 303A-303C prevent backward current flow from the battery cassettes 307A-307C. The battery cassettes 307A-307C can also be configured to be charged by the respective solar panels $SP_A$-$SP_C$. Diodes 305A-305C can prevent backward current flow from the battery cassettes 307A-307C to the solar panels $SP_A$-$SP_C$.

The battery charging system can be configured to provide voltage outputs to a load at each of $V_A$, $V_B$, and $V_C$, even while the system is being charged or balanced.

In some embodiments, the battery cassettes 307A-307C can include lead acid batteries. In some embodiments, the battery cassettes 307A-307C can include lithium batteries, alkaline batteries, zinc-carbon batteries, NiMH batteries, NiCd batteries, super capacitors, or other types of batteries. In some embodiments, the battery cassettes can include carbon anode terminals or lead-carbon capacitors in electrodes in an UltraBattery configuration.

In some embodiments, the battery cassettes 307A-307C can include different quantities of batteries in series and/or provide a different voltage output than other battery cassettes. For example, if each battery in the battery cassettes 307A-307C provided 13.33V, the battery cassette $V_A$ can provide a 53.33V output, the battery cassette $V_B$ can provide a 40V output, and the battery cassette $V_C$ can provide a 26.66V output, and the total voltage across the series of battery cassettes 307A-307C can be 120V. The technology disclosed herein can include any number of batteries in the battery cassettes 307A-307C at any ratios in any number of battery cassettes. Although the total voltage across the plurality of battery cassettes 307A-307C is described as 120V to provide a voltage compatible for residential applications in the U.S., the technology disclosed herein can be extended to provide 240V or any other voltage for any use in any application. The batteries in each battery cassette can be configured to provide any amount of voltage, such as 1.5V, 3V, 5V, 9V, 12V, 12.6V, 24V, 48V, or any other voltage. In some embodiments, the battery cassettes 307A-307C can include same numbers of batteries and/or provide a same amount of voltage as other battery cassettes.

In some embodiments, the battery cassettes 307A-307C can be configured to have decreasing, different voltages capacities (in V) and different energy capacities (in kWh). For example, voltages and energy capacities of the battery cassettes 307A-307C can be proportional to incremental parts of a sinusoidal waveform as further discussed with respect to FIG. 5.

The temperatures sensors $S_T$ and voltage sensors $S_V$ can be configured to measure the temperatures and voltages of each of the battery cassettes 307A-307C. Outputs from the temperatures sensors $S_T$ and voltage sensors $S_V$ can be provided to the controller 117. In some embodiments, the voltage sensors $S_V$ can be configured to sample or measure voltages of the battery cassettes at times when little or no current is being drawn from the battery cassette. The times can include times when no load is connected or drawing current. The times can also include times at which an AC output is at or approximately crossing a zero point when a load is connected and drawing the AC output. Accordingly, a common clock shared with inverter of FIG. 5, an output from the inverter of FIG. 5, or other timing indicator can be used by the voltage sensors $S_V$ to determine measurement times.

The solar panels $SP_A$-$SP_C$ are examples of the secondary power sources 127 described in FIG. 1. Each respective solar panel $SP_A$-$SP_C$ can be configured to provide secondary power to a respective battery cassette 307A-307C. In some embodiments, the solar panels $SP_A$-$SP_C$ can additionally or alternatively include a wind turbine, geothermal power generator, combustion power generator, or other secondary power source. The solar panels $SP_A$-$SP_C$ can be configured to provide power through a current sensor $S_1$ and through a respective diode 305A-305C to a respective battery cassette 307A-307C. The diodes 305A-305C can be configured to prevent backward flow of current from the battery cassettes 307A-307C to the solar panel $SP_A$-$SP_C$. The secondary power sources $SP_A$-$SP_C$ can be coupled to the battery side of the switches $SW_A$-$SW_C$ to provide energy to the respective battery cassettes whenever energy is generated. Therefore, the secondary power sources $SP_A$-$SP_C$ can be configured to provide power regardless of the switching scheme.

The current sensors $S_I$ can be configured to measure the amount of current generated by the respective solar panels $SP_A$-$SP_C$. An output from the current sensors $S_1$ can be provided to the controller 117. The energy output of solar panels $SP_A$-$SP_C$ can vary throughout the day. For example, some solar panels $SP_A$-$SP_C$ can be configured to generate from 0 to 50 amps of current as sunlight peaks throughout the day. The current sensors $S_1$ can be used to determine how an actual amount of current generated by the solar panels $SP_A$-$SP_C$ compares to a predicted amount of current generated by the solar panels based on a weather forecast. The measured amount of current generated by the solar panels $SP_A$-$SP_C$ in view of a weather forecast can also be logged as historical data to use for predicting future amounts of energy that will be generated.

The controller 117 can be configured to control the switches $SW_A$-$SW_C$ for charging, for balancing the states of charge of the battery cassettes 307A-307C. To select a battery cassette (such as battery cassette 307A) for charging, the respective switch pair (such as $SW_A$) can be closed while the other switch pairs (such as $SW_B$ and $SW_C$) can be opened. The control signals CA-CC can be provided to open or close the respective switch pairs $SW_A$-$SW_C$.

In some embodiments, the controller 117 can be configured to charge the battery cassettes 307A-307C one at a time. In some embodiments, the controller 117 can be configured to charge the battery cassettes 307A-307C in cycles. During each cycle, current can be provided from the grid to charge each of the plurality of battery cassettes 307A-307C, and the controller 117 can sequentially and individually charge the battery cassettes 307A-307C during each cycle. The controller 117 can determine how much current, if any, to provide to each battery cassette 307A-307C during a charging cycle based on a projected energy deficit of each battery cassette, a state of charge of the battery cassette, a charging profile, and/or other factors further described with respect to FIG. 6. The energy deficit of a battery cassette can be determined based on a difference between a projected amount of energy provided by secondary power sources to a battery cassette over a period of time and a projected amount of energy to be drained from the battery cassette over the period of time.

In some embodiments, the controller 117 can periodically or algorithmically balance the state of charge of the battery cassettes 307A-307C. The state of charge of each battery cassette 307A-307C can be balanced relative to (proportionally, absolutely, or a combination thereof) the states of charge of other battery cassettes 307A-307C. A state of charge of battery cassette, such as 307A, can be balanced against a state of charge of a second battery cassette, such as 307C, if a state of charge of the battery cassette 307A is lower than expected while a state of charge of the battery cassette 307C is higher than expected. In such a case, the battery cassette 307A can be charged for a period of time to bring the state of charge of the battery cassette 307A until a balancing threshold is reached. For example the balancing threshold can include charging the battery cassette 307A for a period of time, until a battery cassette 307A reaches a threshold state of charge.

Figure 3B:
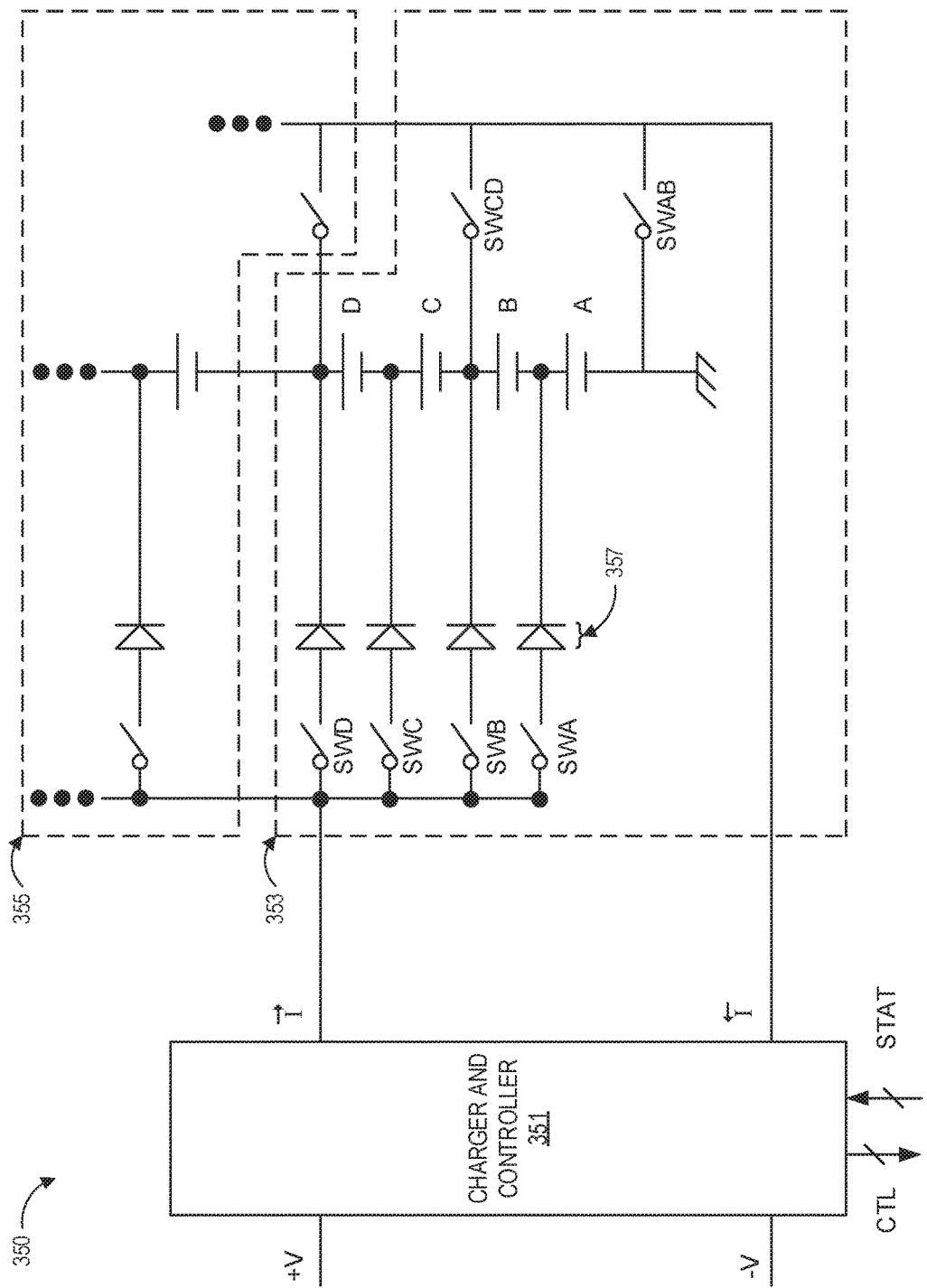
FIG. 3B is a block diagram of a battery charging system according to certain embodiments including six battery cassettes.

The controller 117 can receive information from the various sensors, including the current sensors $S_I$, the temperature sensors $S_T$, and the voltage sensors $S_V$. Data from the voltage sensors $S_V$ can be used to determine a state of charge of each respective battery cassette 307A-307C. The state of charge of the battery cassettes 307A-307C can be used to determine energy deficits, to determine whether or not to rebalance, to log historical energy use, and to make other decisions based on the states of charge of the battery cassettes 307A-307C. Data from the temperature sensor $S_T$ can be used to interrupt charging to a battery cassette 307A-307C if a particular battery cassette (including if a battery within the battery cassette) overheats. Data from the current sensors $S_I$ can be used to determine how much energy is being provided from the secondary power sources. For example, if the controller 117 selects a first amount of grid current for charging the first battery cassette 307A based on an energy deficit that is calculated based on a difference between a projected amount of energy generated by the solar panel $SP_A$ and a projected amount of energy to be used by the first battery cassette 307A, and if the sensor also $S_I$ indicates that the solar panel $SP_A$ generates less than the projected amount of energy, then the first amount of grid current can be increased to a second amount of grid current to account for the large than projected energy deficit. FIG. 3B is a block diagram 350 of an embodiment of a battery charging system. The block diagram 350 shows four battery cassettes A, B, C, and D in a first circuit 353, which can be expanded with additional battery cassettes in a second circuit 355. The first circuit 353 can include a plurality of switches SWA, SWB, SWC, SWD, SWAB, and SWCD and plurality of diodes 357.

The circuits 353 and 355 can be used as an alternative or in addition to the circuits shown in FIG. 3A. Parts of FIG. 3B, such as the diodes 357, can be the same or different diodes from components shown in FIG. 3A, such as the diodes 303A-303C. The secondary energy sources of FIG. 3A, such as the solar panels $SP_A$-$SP_C$, and sensors are not reproduced in FIG. 3B but can be similarly coupled on either side of the diodes 357. In combination with other systems such as the system of FIG. 5, efficiencies of over 90%, 95%, or 97% can be achieved in some embodiments.

A plurality of status signals (STAT) from sensors can be provided to the controller 351, and a plurality of control signals (CTL) can be used to control the various switches $SW_A$-SWD, SWAB, and SWCD.

The diodes 357 are each coupled between a respective switch $SW_A$-SWD and a positive terminal of a respective battery cassette A-D to prevent reverse current flow from the battery cassettes A-D. The switches can be normally open. In some embodiments, the switches can be implemented as relays.

Each of the battery cassettes A-D can include a plurality of battery cells in series. In various embodiments, the battery symbols can represent a single cell battery, a group of cells, or a battery cassette. Individuals, pairs, or any plurality of the battery cassettes can be charged or balanced at the same time. The battery cassettes can be fully isolated and floating.

To charge or balance the first pair of battery cassettes A and B, switch SWB and switch SWAB can be closed while the other switches are open. In some embodiments, such as when used in combination with the system shown in FIG. 5, battery cassette B can be expected to use less energy and therefore charge sooner than battery cassette A. When battery cassette B reaches a charging threshold, the switches can reconfigure to continue charging battery cassette A without continuing to charge battery cassette B. To charge battery cassette A without charging battery cassette B, switches SWA and SWAB can be closed while the other switches are open. Battery cassette A can then be charged until a charging threshold for battery cassette A is reached. The charging thresholds for battery cassettes A and B can be voltage thresholds. The voltage thresholds can be thresholds that indicate a full capacity charge or nearly full capacity charge for the respective battery cassettes, or the voltage thresholds can be set based on factors further described with respect to FIG. 6 or energy deficits described herein.

To charge or balance the second pair of battery cassettes C and D, switch SWD and switch SWCD can be closed while the other switches are open. In some embodiments, such as when used in combination with the system shown in FIG. 5, battery cassette D can be expected to use less energy and therefore charge sooner than battery cassette C. When battery cassette D reaches a charging threshold, the switches can reconfigure to continue charging battery cassette C without continuing to charge battery cassette D. To charge battery cassette C without charging battery cassette D, switches SWC and SWCD can be closed while the other switches are open. The charging thresholds for battery cassettes A and B can be voltage thresholds. The voltage thresholds can be thresholds that indicates a full capacity charge or nearly full capacity charge for the respective battery cassettes, or the voltage thresholds can be set based on factors further described with respect to FIG. 6 or energy deficits described herein.

To charge or balance any series of battery cassettes, the switches at the ends of the battery cassettes can be closed. For example, to charge all battery cassettes A-D, the switches SWAB and SWD can be closed. Similarly, battery cassettes A, B, and C can be charged by closing switches SWC, SWB, and SWA. The table below summarizes which of the normally open switches can be closed to charge which pairs battery cassettes or individual battery cassettes.

| X = Closed | A | A and B | C | C and D |
|---|---|---|---|---|
| SWA | X | | | |
| SWB | | X | | |
| SWAB | X | X | | |
| SWC | | | X | |
| SWD | | | | X |
| SWCD | | | X | X |

Figure 5:
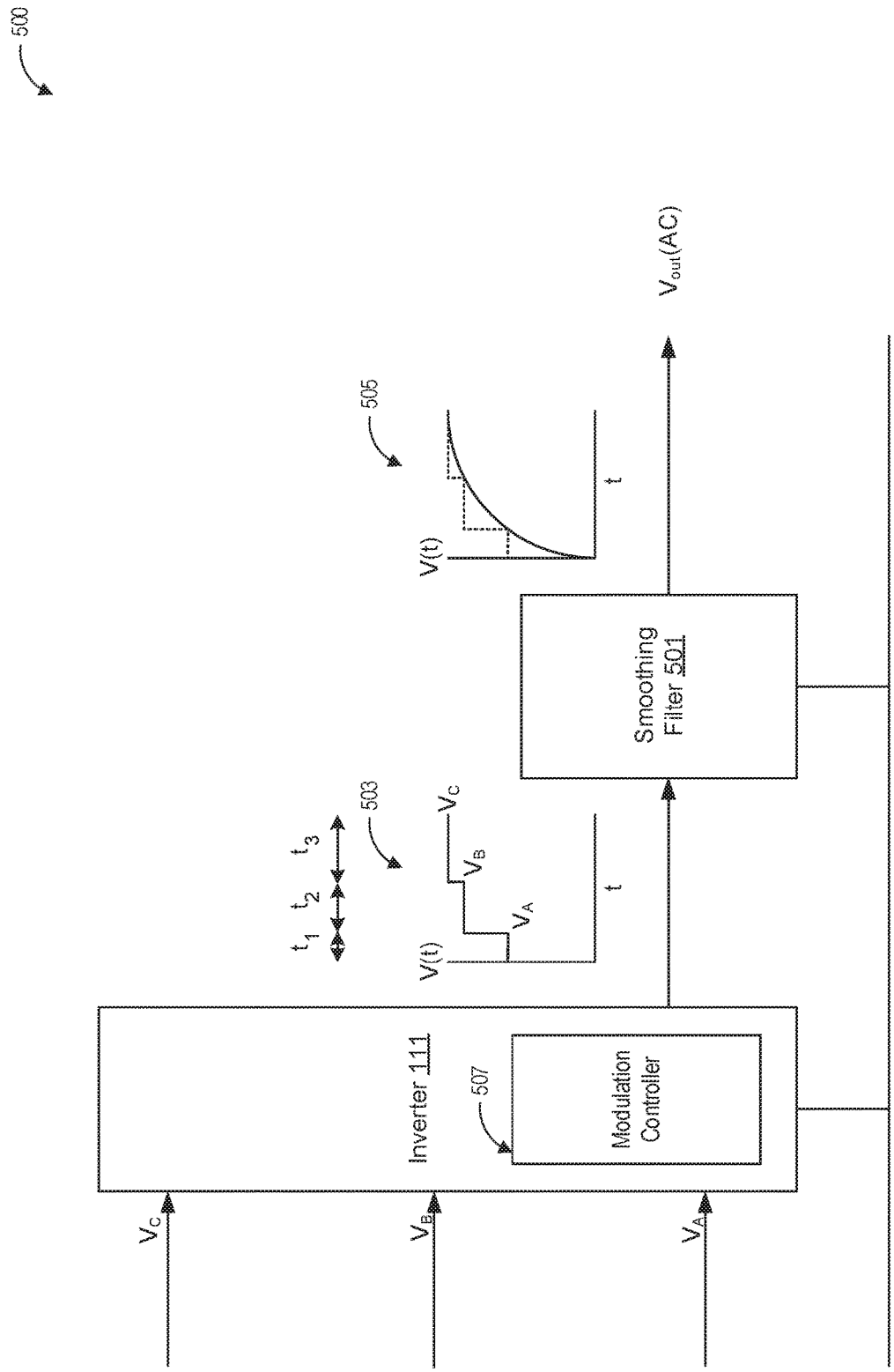
FIG. 5 shows an example block diagram of an inverter output system according to certain embodiments.

For improved accuracy, the voltage of a battery cassette can be measured when little or no current is being drawn from the battery. This can occur when no load is using electricity, such as when all connected electronics are off. When the output of the battery cassettes are provided to an inverter to generate a sinusoidal AC current, such as shown in FIG. 5, the voltage of the battery cassette can still be more accurately measured even while connected electronics are powered on. The improved accuracy can be achieved by measuring or sampling the voltage of the battery cassette at times when the voltage of the sinusoidal output signal is at or approximately crossing a zero voltage output.

Figure 4:
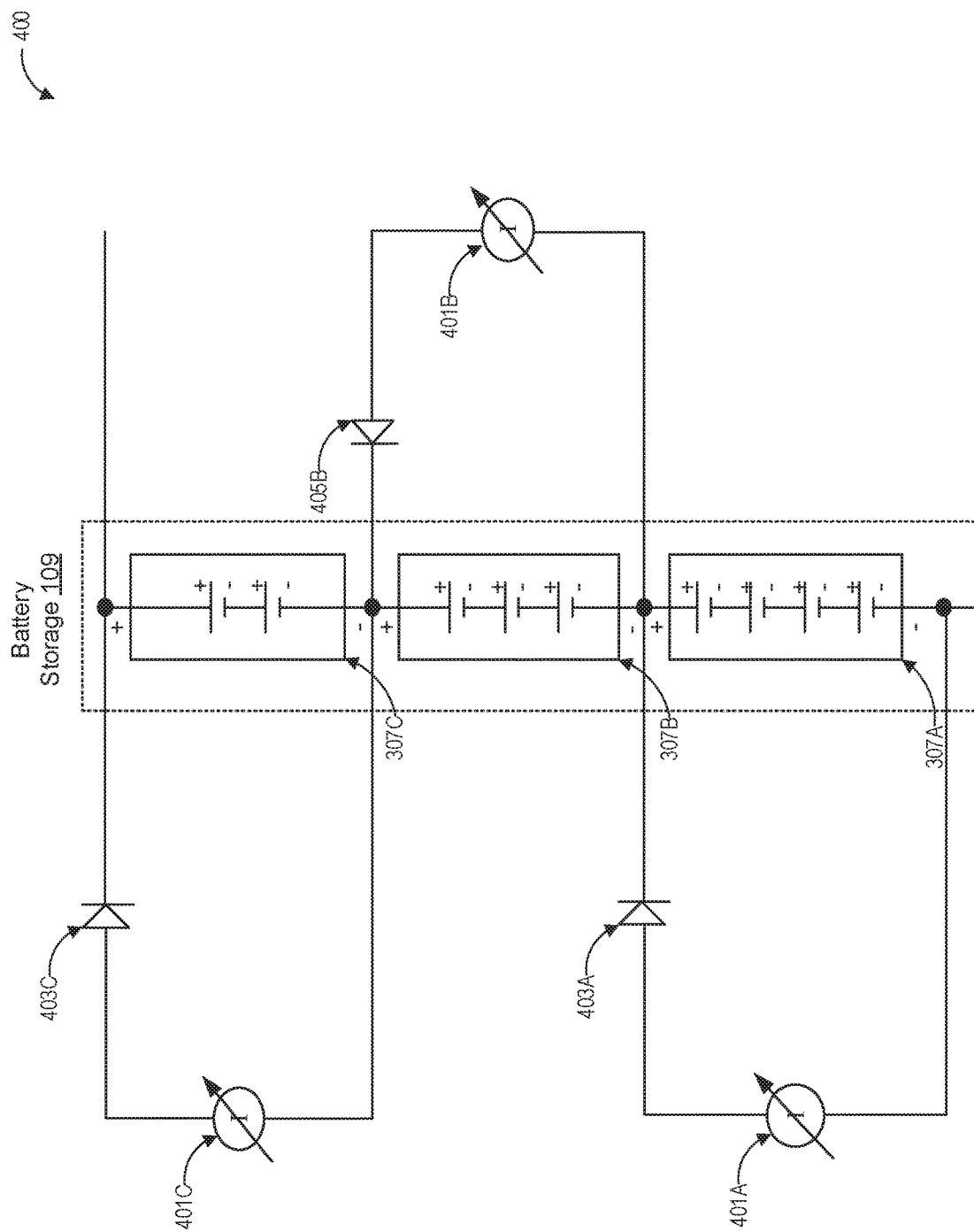
FIG. 4 shows an example block diagram for balancing battery cassettes according to certain embodiments.

The second circuit 355 can include any number of additional battery cassettes. The structure from the first circuit 353 can be copied and extended in the second circuit 355 to add more battery cassettes that can be selectively charged as pairs, individually, or as pluralities. Although the example discussed with FIG. 3 can include simultaneously charging or balancing a pair of battery cassettes until a first threshold is reached and subsequently continuing to charge or balance the remaining battery cassette that has a greater energy deficit, other embodiments can include simultaneously charging or balancing a plurality of battery including more than a pair of battery cassettes and continuing to charge or balance the battery cassettes of the plurality of battery cassettes that have greater energy deficits until charging thresholds are reached for each battery cassette in the plurality of battery cassettes. FIG. 4 is a block diagram 400 illustrating an embodiment for balancing battery cassettes. The block diagram 400 can include a battery storage 109 including a plurality of battery cassettes 307A-307C, respective variable current sources 401A-401C, and diodes 403A-403C. The variable current sources 401A-401C can be any source providing variable current, such as the grid, fuel cells, generators, and the like. The variable current sources 401A-401C can be individually activated, programmed, or controlled to provide current to the respective battery cassettes 307A-307C. In some embodiments, uncontrolled sources such as solar panels, wind turbines, and rain generators can be additionally or alternatively used. In some embodiments, the variable current sources are provided to the battery cassettes by way of the charger and controller 351 shown in FIG. 3B, which can control the distribution of current to different battery cassettes. In some embodiments, the controlled variable current sources can be provided to battery cassettes by way of the charger and controller while uncontrolled sources can be provided to the battery cassettes without being provided to the charger and controller. The variable current sources 401A-401C can be used to individually charge each of the respective battery cassettes 307A-307C. The variable current sources 401A-401C can also be controlled by a controller to balance states of charges of the respective battery cassettes 401A-401C. The diodes 403A-403C can prevent reverse current flow. In some embodiments, the circuitry of FIG. 4 can be included in the system shown in FIG. 3A.

FIG. 5 is a block diagram 500 illustrating an embodiment of an inverter output system. The inverter output system can include an inverter 111 and a smoothing filter 501. A first graph 503 shows a part of an output signal of the inverter 111. A second graph 505 shows a part of an output of the smoothing filter 501. The inverter 111 can include a modulation controller 507.

The inverter 111 can receive the voltages $V_A$, $V_B$, and $V_C$ from the corresponding voltage output nodes shown in FIG. 3A. As shown in FIG. 3A, because the battery cassettes 307A-307C are coupled in series, the voltage increases from $V_A$ to $V_B$ and from $V_B$ to $V_C$. The inverter can be configured to sequentially select increasing and then decreasing voltages over a period to construct a digital sinusoidal waveform. In some alternative embodiments, the inverter 111 can similarly receive voltages from the positive terminal of each of the battery cassettes A-D shown in FIG. 3B, and the inverter 111 can have a corresponding number of output voltage steps as the number of battery cassettes, such as 4 output voltage steps or more.

The graph 503 shows an example of a first quarter of a digital sinusoidal waveform that can be constructed by selecting $V_A$, $V_B$, and $V_C$ as outputs of the inverter. The next quarter of the digital sinusoidal waveform can be constructed by subsequently selecting $V_B$, and $V_A$ as outputs of the inverter. Accordingly, in some embodiments, the voltage outputs of the battery cassettes 307A-307C of FIG. 3A can be proportional to incremental amplitudes of a sinusoidal waveform. For the example inverter scheme, the battery 307A is drained to generate a larger part of the sinusoidal waveform than an output from the battery 307C, which is used for generating only the upper amplitude of the sinusoidal waveform. Accordingly, in some embodiments, the battery cassette 307A can have a proportionally large capacity (e.g., in kWh) as compared to the battery cassette 307C based on the contribution of the respective battery cassette to generating the sinusoidal waveform.

The digital sinusoid signal can be provided to a smoothing filter 501. The smoothing filter 501 can smooth out the digital sinusoidal waveform. At the output of the smoothing filter, an AC output voltage $V_{out}(AC)$ is provided as shown by graph 505. The frequency and voltage of the AC output voltage can be configured with a voltage and frequency compatible with a load. For example, the AC output voltage can have a 120 V amplitude and at a 60 Hz frequency for use in residences in the United States. In other examples, AC output voltages of other amplitudes and frequencies can be generated.

The modulation controller 507 can be configured to control the time spans such as $t_1$, $t_2$, and $t_3$ during which energy is drawn from each of the battery cassettes. In some embodiments, the modulation controller can be configured to quickly couple and decouple outputs from the battery cassettes at different speeds to cause intermediate outputs. For example, to generate the initially rising part of the sinusoid output, the first voltage $V_A$ can be quickly switched on and off with a low duty cycle during the initial part of time period $t_1$, and the duty cycle can be increased to full duty cycle as time period $t_2$ approaches.

Control Inputs

Figure 6:
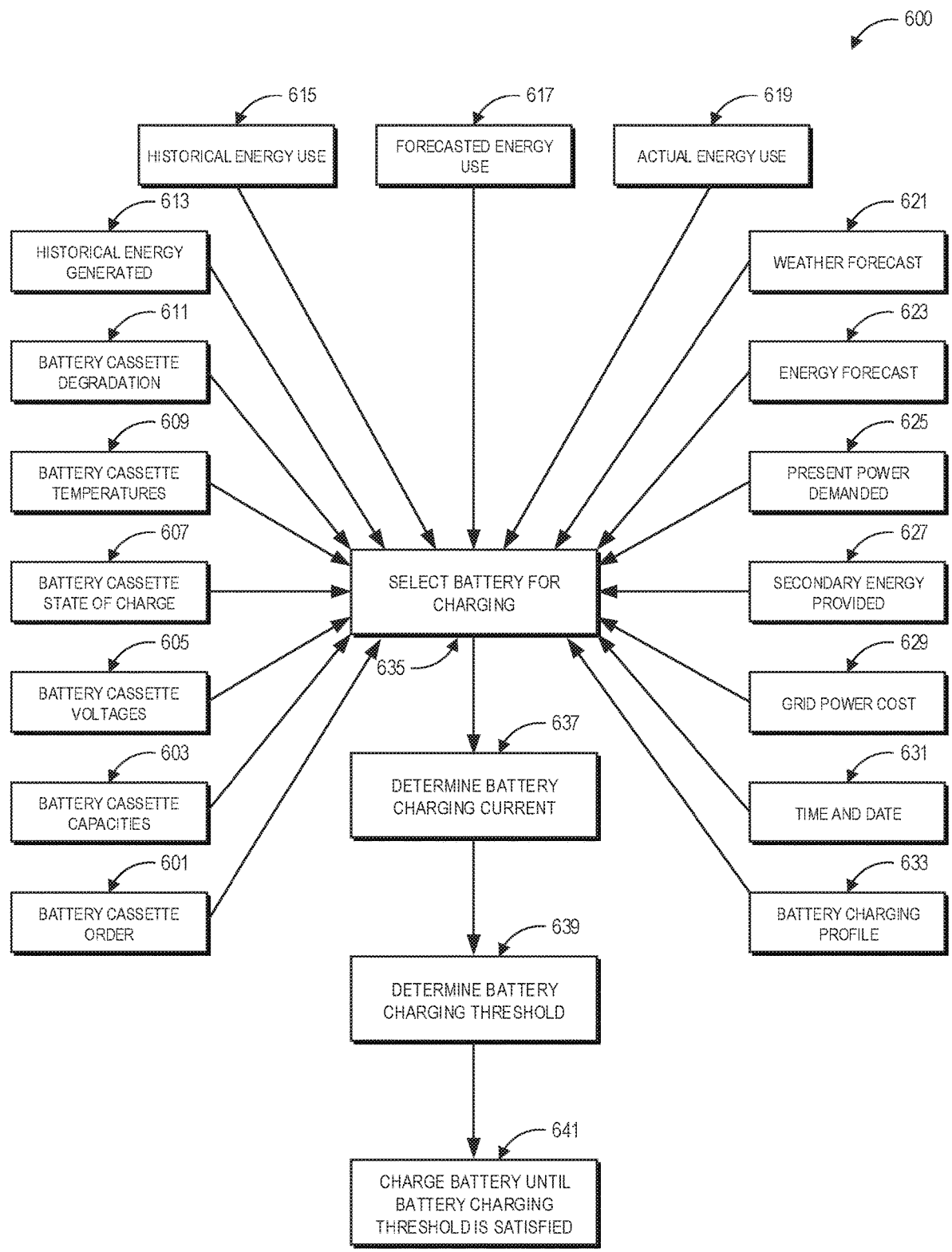
FIG. 6 shows a flowchart for managing battery charging according to certain embodiments.

FIG. 6 shows a flowchart 600 for an embodiment of managing battery charging. Inputs to a controller can include one, all, or any combination of the following: a battery cassette order 601, battery cassette capacities 603, battery cassette voltages 605, states of charge of the battery cassettes 607, battery cassette temperatures 609, battery cassette degradation 611, an average energy output 613, historical energy use 615, forecasted energy use 617, actual energy use 619, a weather forecast 621, an energy forecast 623, a present power demanded 625, a secondary power provided 627, a grid power cost 629, a time and date 631, and a battery charging profile 633.

Based on the inputs 601-633, a battery cassette can be selected for charging at block 635, a battery charging current can be selected at block 637, and a battery charging threshold can be determined at block 639. At block 641, the selected battery can be charged with the determined battery charging current until the battery charging threshold is satisfied. The selected battery can be charged from the grid. The charging thresholds can include, for example, charging for a time duration, charging a certain amount of energy, charging until a voltage of the battery cassette increases by a certain amount, and the like.

The battery cassette order 601 can be used to sequentially select a battery cassette for charging during each charging cycle. For example, the battery cassettes of FIG. 3A can be selected in the order of 307A, then 307B, then 307C. In some embodiments, the battery cassette order 601 is also related to the battery cassette capacities 603, such as when configured for generating a digital sinusoidal waveform as discussed with respect to FIG. 3 and FIG. 5. The battery cassette order 601 and energy use 619 of each battery cassette is also related to and can be affected by the modulation scheme used by the inverter discussed with respect to FIG. 5.

The battery cassette capacities 603 can be used to determine a charging current and/or battery charging threshold. Battery cassettes with larger kWh capacities (for example, the battery cassette 307A of FIG. 3A when used for generating a sinusoidal waveform as discussed with respect to FIG. 5) can be charged with larger currents and/or for longer periods of time. Battery cassettes with smaller kWh capacities (for example, the battery cassette 309C of FIG. 3A when used for generating the upper amplitude of the sinusoidal waveform as discussed with respect to FIG. 5) can be charged with smaller currents and/or for shorter periods of time.

Figure 8:
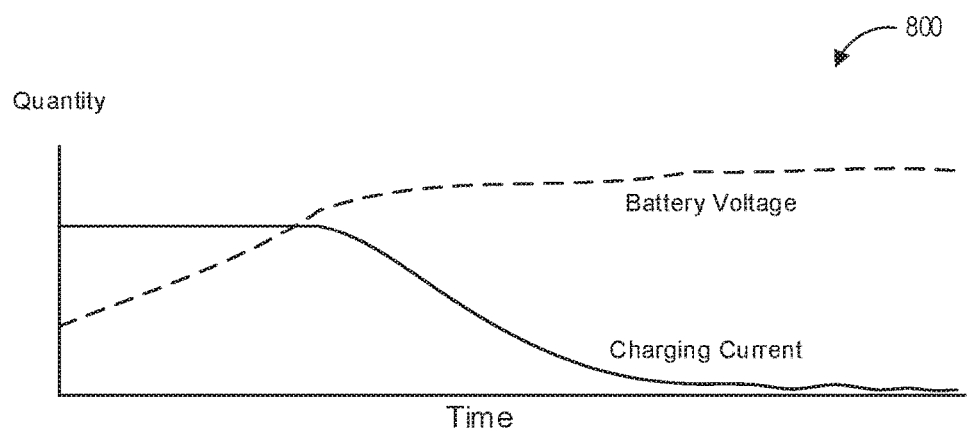
FIG. 8 shows an example charging profile and an example application 850 thereof according to certain embodiments.
Figure 8:
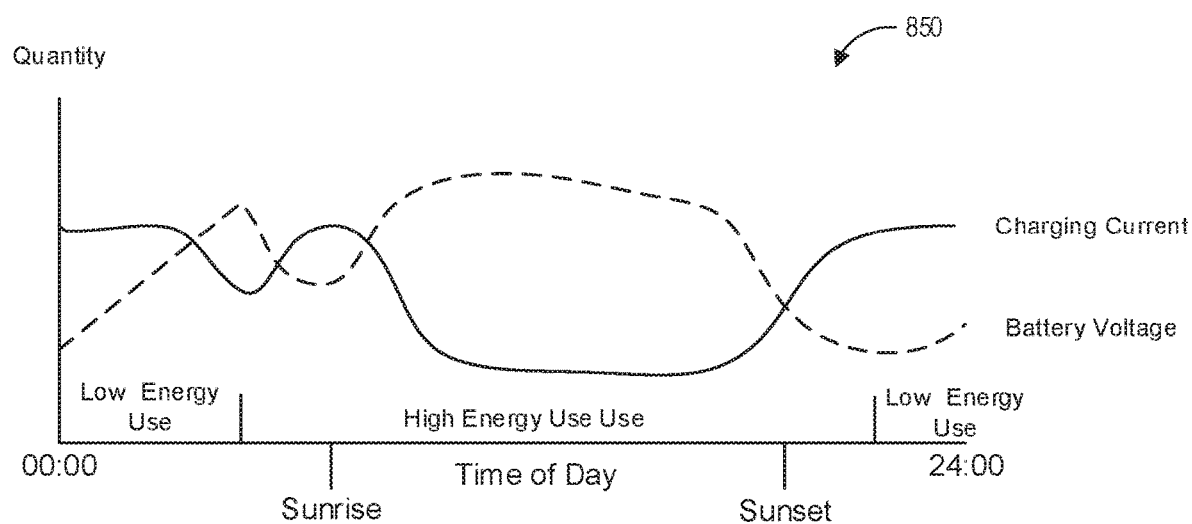

The voltage of a battery cassette 605 can be an indicator of the state of charge of the battery cassette 607. A battery cassette with a lower voltage 605 or lower state of charge 307 can be charged with a greater current, charged for a longer period of time, and/or charged until a voltage threshold is reached for the battery cassette. A battery cassette with a higher voltage 605 or higher state of charge 307 can be charged with a smaller current, charged for a shorter period of time, and/or charged until a voltage threshold is reached for the battery cassette. The state of charge of a battery cassette 307 can be determined by comparing a voltage of a battery cassette 605 (for example, using the voltmeter Vi) to a rated voltage for the battery cassette. In some embodiments, the voltage threshold for charging can be determined based on the present voltage, for example, such as approximately +0.1V from the present voltage if the voltage is significantly lower, or approximately +0.05V from the present voltage if the present voltage is higher. In some embodiments, the charging current for a battery cassette can be determined according to a current to a predetermined or stored voltage profile for the battery cassette, such as shown in FIG. 8.

The battery cassette temperatures 609 can be used to limit the battery charging current and/or battery charging threshold. As the battery temperature rises or exceeds a temperature threshold, the battery charging current can be reduced or stopped to prevent overheating. As the battery cassette temperature rises or exceeds a high temperature threshold, the battery charging time can be reduced or stopped to prevent overheating.

The battery cassette degradation 611 can be accounted for in determining charging temperatures and/or charging thresholds. A degraded battery may take a longer time to charge to a reduced maximum state of charge, and a degraded battery may be damaged by higher charging currents. Accordingly, the charging current can be reduced and applied for a longer duration if a battery cassette is degraded.

The current and amount of time for charging a battery cassette can be determined based on a projected energy deficit, for example, to provide enough energy to make up for the projected energy deficit. The energy deficit can be determined as a difference between a projected energy use and a projected amount of energy that will be generated by secondary power sources.

The projected amount of energy use can be determined based on a historical energy use 615, weather forecast 621, and/or time and date 631. Historical energy outputs can be used as a baseline estimate for projected energy uses. The baseline estimate can be adjusted based on the weather, for example, to account for energy to use for heaters or air conditioning if the weather is forecasted to be hotter or colder. The baseline estimates can also account for the time and date. For example, weekends can have different baseline estimates than weekdays, and projected energy uses at nighttime can have different projected estimates than projected energy uses for daytime. Examples of using the average energy output 613 and historical energy 615 use are further discussed with respect to FIG. 7.

The energy forecast 623, which can be separate or included in the weather forecast 621, can be used to determine the projected amount of energy that will be generated. For example, if solar panels are used to generate energy, then a weather forecast 621 indicating cloudiness or insolation forecast as an energy forecast 632 can be used to estimate an amount of energy that the solar panels will generate. As another example, if a wind turbine is used to generate energy, then a weather forecast 621 including a wind forecast or a separate wind forecast as an energy forecast 623 can be used to estimate an amount of energy that the wind turbine will generate.

The historical energy generated 613 can also be used to determine the projected amount of energy that will be generated. The historical energy generate 613 can include average, actual, or other statistical indicators of energy generated by the various secondary power sources under one or more conditions, such as under various weather conditions. A baseline projected amount of energy that the secondary power sources can generate can be determined based on the historical energy generated 613.

For larger projected energy deficits, the charging current can be increased and/or the charging time can be increased to charge the battery cassettes with enough energy to account for the projected deficit. For smaller projected energy deficits, the charging current can be reduced and/or the charging time can be reduced to charge the battery cassettes with lower amounts of energy.

An actual energy use 619 can be used to determine whether the actual energy use is comparable to, is greater than, or is less than the forecasted energy use 617. In some embodiments, the actual energy use 619 can be used to determine how an average energy use for a period of time compares to an average forecasted energy use 617. Based on the comparison, the charging current and/or charging thresholds can be adjusted to account for inaccuracies in the forecasted energy use 617. For example, if an average actual energy use 619 for a period of time, such as the day time, is less than a forecasted energy use 617, then the charging current and/or charging thresholds can be subsequently reduced, such as over the night time. The energy use of each battery cassette can be affected by the modulation scheme of the inverter 111 discussed with respect to FIG. 5.

Similarly, a present power demanded 625 can be used to determine whether or not the forecasted energy use 617 is accurate. If a present power demanded 625 indicates irregular power use greater than or less than the historical energy use 615 on which the forecasted energy use was based, then the charging current and/or charging thresholds can be adjusted accordingly.

The secondary energy provided 627 can be used to determine whether the actual energy generated by secondary power sources is comparable to, is greater than, or is less than the projected amount of energy that will be generated by secondary power sources. Based on the comparison, the charging current and/or charging thresholds can be adjusted to account for inaccuracies in the projected amount of energy that will be generated by secondary power sources. For example, if a secondary power provided 627 for a period of time, such as the day time, is greater than a projected amount of energy that will be generated by secondary power sources, then the charging current and/or charging thresholds can be subsequently reduced, such as over the night time.

The grid power cost 629 along with the date and time 631 can be used to set the charging current. The charging current can be increased at times when the grid power cost is less expensive, and the charging current can be reduced at times when the grid power is more expensive. Further examples are shown in FIG. 7.

The various factors 601-631 can be combined and used to different extents and in various ways. The factors 601-631 can be selected in different combinations and used with different weightings to generate different battery charging profiles 633. The charging profiles 633 can indicate what currents to charge the battery cassettes with. Examples of two different charging profiles are shown in FIG. 7. Other examples of charging profiles 633 can include selections to charge with a specified current, with a maximum current, with a specified power, with a maximum power, or any other power-related characteristic that can be dependent or independent of a state of charge of a battery cassette. The selection of a charging profile 633 can be specified by a user, such as through a user interface presenting a menu.

Example Graphs and Charging Profiles

Figure 7:
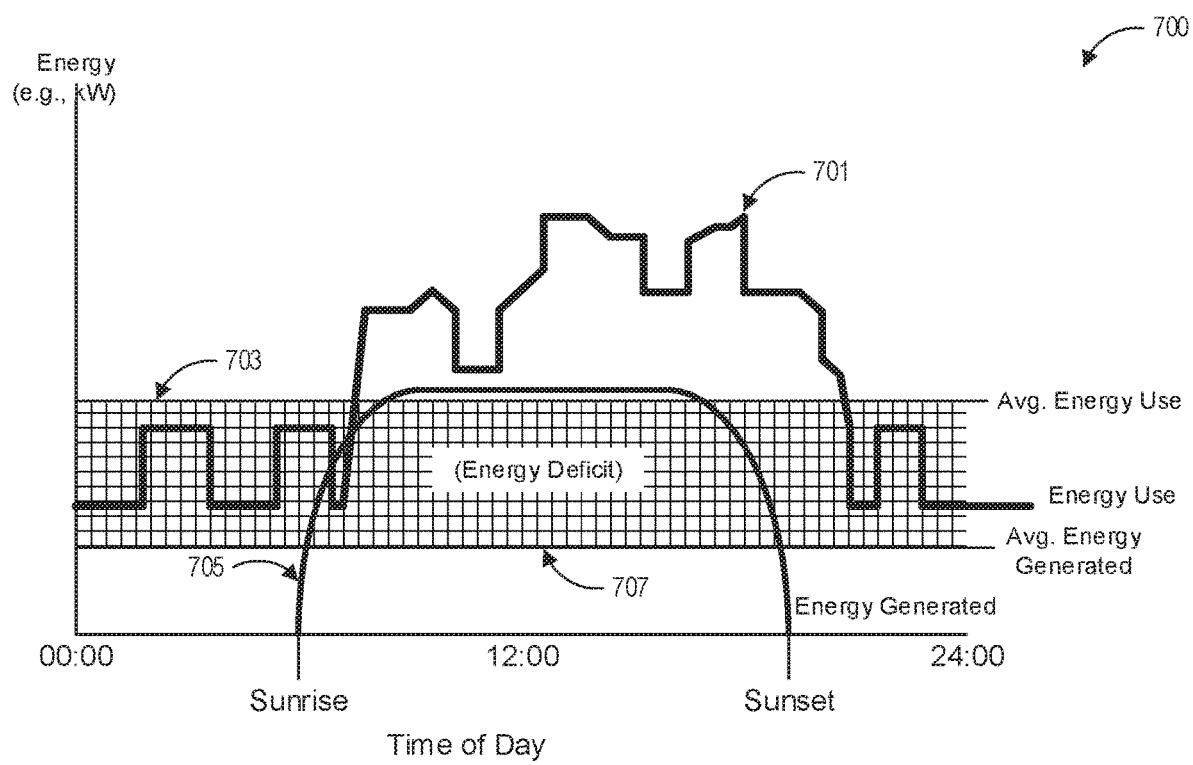
FIG. 7 shows a graph of energy and charging profiles according to certain embodiments.
Figure 7:
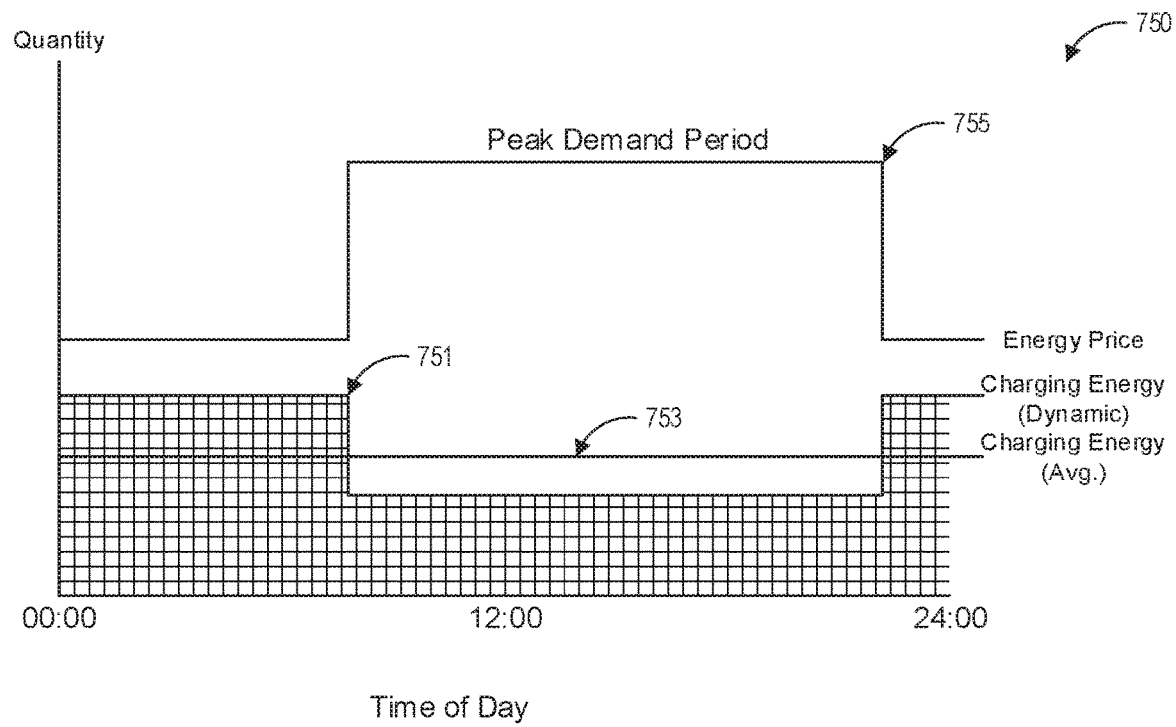

FIG. 7 shows a graph of embodiments of energy 700 and charging profiles 750. The graphs 700 and 750 can be applicable to example battery cassettes discussed herein.

The x-axis of the graph of energy 700 indicates a time of day. The y-axis of the graph 700 indicates an energy quantity, such as in kW. The bold line 701 indicates an actual energy use throughout the day. A first horizontal line 703 indicates an average energy use over the day, such as the average of the line 701 over the day. A curved line 705 indicates an energy generated from secondary energy sources throughout the day, which for solar panels increases starting at sunrise, reaches a maximum output for several hours, and then decreases around sunset. A second horizontal line 707 indicates an average energy generated by the secondary energy sources, such as an average of the line 705 over the day.

The energy deficit can be determined as the difference between the energy used and the energy generated by the secondary power sources. The energy deficit can be represented as the shaded area between the line of average energy use 703 and the line of average energy generated by the secondary power sources 707.

The charging profiles 750 can include a first charging energy profile 751, a second charging energy profile 753, and an indication of a price of grid energy 755 throughout the day. The charging energy profile 753 can be determined to compensate for the energy deficit from the graph 700. For example, the area under the line 753 can indicate a quantity of energy that is approximately equal to or greater than the energy deficit of the graph 700. The example charging energy can be used to determine a static or average charging current for a battery cassette throughout the day without regard to the energy price.

The line 751 indicates a dynamic charging energy profile that is determined based on the energy price 755. During times of day when the energy price 755 is higher, such as during a peak demand period, the charging energy 751, which corresponds to a charging current for a battery cassette, can be reduced or stopped. During times of day when the energy price 755 is lower, the charging energy 751 can be increased. The total charging energy provided over from the charging profile 751 can be approximately equal to or based on the energy deficit from the graph 700. For example, the shaded area under the line 751 can be approximately equal to or greater than the energy deficit from the graph 700.

FIG. 8 shows an embodiment of an example charging profile 800 and an embodiment of an example application 850 thereof. The charging profile 800 indicates a specified charging current for a battery cassette based on a battery voltage for the battery cassette. The charging profile can be used to improve the lifespan of the battery cassette. When the battery cassette is at a low state of charge, a greater current can be used to charge the battery cassette. As the battery cassette approaches full capacity, indicated by the increasing voltage, the amount of charging current can be reduced until a trickle charge is used to maintain a full or near-full state of charge.

The example application 850 shows an application of the charging profile over an example day. Starting at midnight, during a period of low energy use, the battery voltage begins low, and a higher charging current can be used to charge battery cassettes. As the battery voltage increases, the charging current begins to decrease. When a period of high energy use begins, the voltage of the battery cassette drops, causing the charging current to increase again. Around sunrise, a secondary power source (such as a solar panel) can begin to generate energy to keep a voltage of the battery cassette high, and the charging current remains low until about sunset. After sunset but still within the period of high energy use, the battery cassette drains, and the charging current increases. After a period of low energy use, the battery voltage begins to rise again as the higher charging current is applied.

Example Flowcharts

Figure 9:
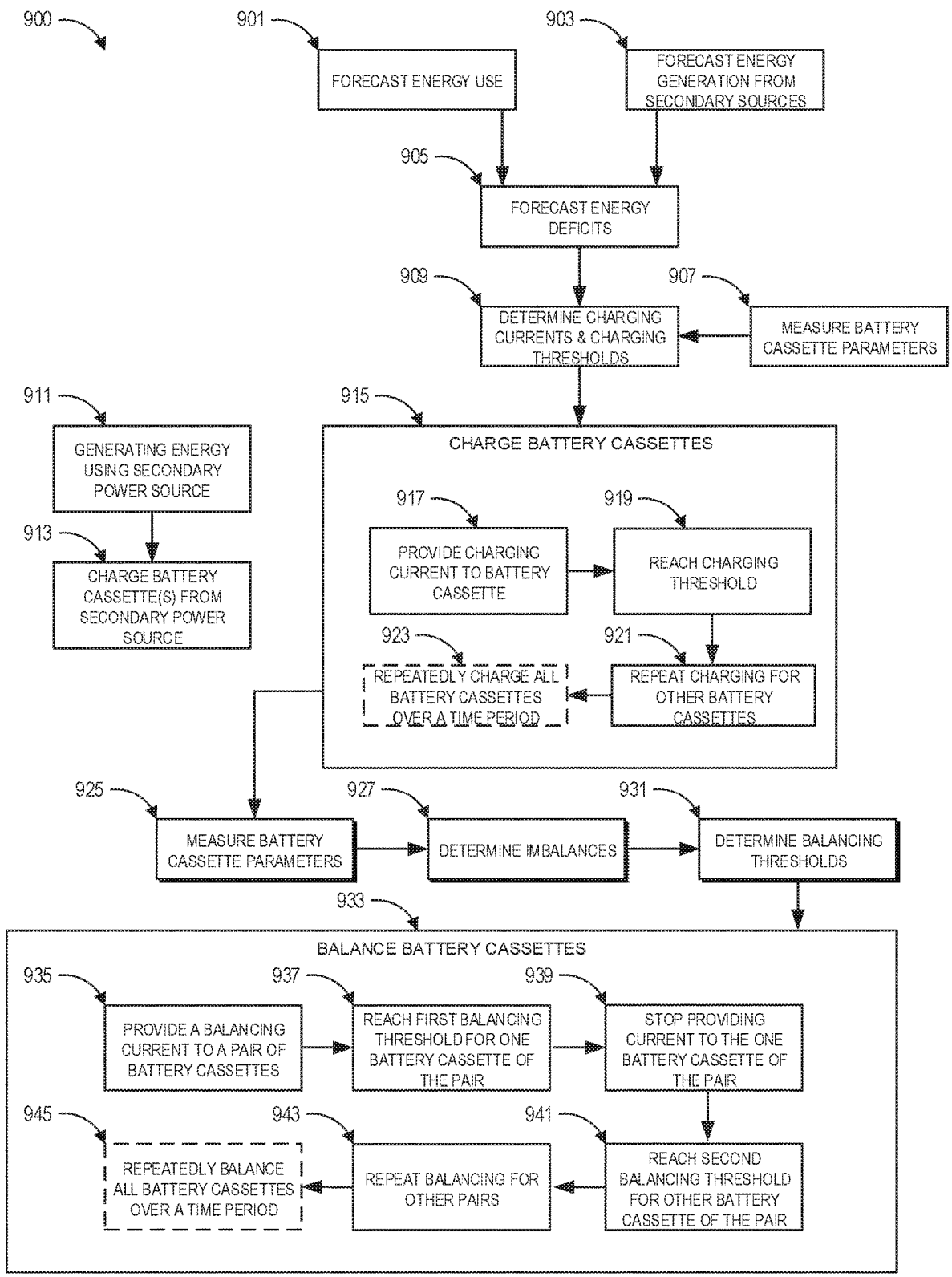
FIG. 9 shows a flowchart for charging battery cassettes according to certain embodiments.

FIG. 9 shows an embodiment of a flowchart 900 for charging battery cassettes.

At block 901, an energy use can be forecasted. The energy use can be forecasted, for example, based one, all, or any combination of: historical energy use, a time, a date, a weather forecast, modulation schemes that an inverter will use with respect to each battery cassette, or other factors. The energy forecast can be determined for a plurality of battery cassettes or for each individual battery cassette.

At block 903, an energy generation from secondary power sources can be forecasted. Examples of secondary power sources can include, for example, solar panels, wind turbines, combustion generators, geothermal generators, etc. The forecast can be based on one, all, or any combination of: the available secondary power sources and their power generation capabilities, a weather forecast, an energy forecast, historical energy generated, a time, a date, or other factors. The energy generation can be forecasted for the collective set of secondary energy sources or forecasted for the secondary energy sources that can be configured to provide energy to each battery cassette.

At block 905, an energy deficit can be forecasted based on a difference between the forecasted energy use and the forecasted energy generation from secondary sources. Examples of energy deficits are illustrated in FIG. 7.

At block 907, battery cassette parameters can be measured or determined. The battery cassette parameters can include one, all, or any combination of: voltages of the battery cassettes, energy capacities of the battery cassettes, temperatures of the battery cassettes, the sequence that the battery cassettes are coupled in, modulation schemes that inverter will use to draw from each battery cassette, or other factors. The state of charge of a battery cassette can be determined based on a voltage across the battery cassette. The no-load voltage can be a more accurate indicator of a state of charge of a battery cassette, and the voltage of the battery cassette can be measured at times when no load is being drawn from the battery cassette, such as during a zero-crossing of a variable load being drawn from the battery cassette.

At block 909, a charging current and charging threshold can be determined for each battery cassette. The charging current and charging threshold can be determined based on the energy deficit forecasted at block 905. The current and charging duration for each battery cassette can be selected to compensate for the forecasted energy deficit over a period of time for which the energy deficit is forecasted. A charging current can be calculated by taking the forecasted energy use, subtracting forecasted energy that will be generated, and dividing the result over a charging period and accounting for the charging voltage for a battery cassette to determine an average charging current for the battery cassette such that when the battery cassette is charged over the charging period, the forecasted energy deficit should be at least mostly compensated for if the forecast is accurate. Additional factors, such as those shown in FIG. 6, can also be accounted for. In embodiments where battery cassettes have different capacities or are used with the type of inverter system of FIG. 5, the forecasted use for each battery cassette will usually be different, and the charging currents for each battery cassette will be different from each other.

Examples of charging thresholds can include time durations, quantities of energy, changes in battery cassette voltages, and the like. Battery cassettes can be charged with the charging current until the charging thresholds are reached. For example, for a system including multiple battery cassettes, the battery cassettes may be sequentially charged for 1 minute each or for 1 hour each. As another example, the battery cassettes may be sequentially charged until they each receive 0.1 kWh each or 10 kWh each. In other embodiments, the charging thresholds can be any other quantities or combination of quantities. For example, there can be charging thresholds that dynamically change for different times of the day as shown in graph 750 of FIG. 7. In some embodiments, a charging threshold can include a period of time that is shorter than a period of time for which the energy deficit is calculated. For example, an energy deficit can be calculated for a 24 hour period, but the charging threshold for which to charge the battery cassettes can be 23 hours to allow for balancing over the remaining 1 hour period.

For example, if each of the three battery cassettes of FIG. 3A are forecasted to have an 8 kWh energy deficit over a 24 hour period, then the charging current can be set at a value to provide 1 kWh of energy over 1 hour to charge to each of the three battery cassettes from the grid. Each of the three battery cassettes can be charged until the threshold (1 hour) is reached, and a next battery cassette can be sequentially selected for charging. Over a 24 hour period, each of the three battery cassettes will have charged for 1 hour in each of 8 cycles to compensate for the 8 kWh energy deficit. As another example, instead of setting the charging threshold at 1 hour, the charging threshold can be set to be any time that 8 kWh of energy is charged to each battery cassette.

At block 911, one or more secondary power sources can be used to generate energy. For example, as shown in FIG. 3A, the solar panels $SP_A$-$SP_C$ are secondary power sources configured to generate energy for each of the respective battery cassettes 307A-307C. In some cases, the energy generated by a secondary power source can be little or none. For example, a solar panel may generate no energy at night or during cloudy times of day.

At block 913, the battery cassettes can be charged from the secondary power source. Blocks 911 and 913 can be performed to charge the battery cassettes whenever secondary power is available throughout the day. For example, battery cassettes coupled to solar panels can be charged whenever the sun is shining, or battery cassettes coupled to a wind turbine can be charged whenever the wind is blowing. As shown in FIG. 3A, secondary power sources can be coupled to charge the battery cassettes regardless of the switching scheme. Blocks 911-913 can be performed in parallel with blocks 915, 933, and/or other parts of FIG. 9.

At block 915, the plurality of battery cassettes can be charged. Block 915 can include blocks 917-923. A charging cycle for each of the battery cassettes can include blocks 913-921. During each cycle, the battery cassettes can be charged in a sequence. The charging cycle can optionally be repeated for any number of cycles and/or for a time duration at block 923. For example, over a 24 hour period, the plurality of battery cassettes can be charged can be charged in 1 hour cycles for 20 hours, with each battery cassette being partially charged during each 1 hour cycle for 20 cycles. In another example, block 915 can include charging each of four battery cassettes for 6 hours over a 24 hour period before proceeding to block 927.

At block 917, energy from the power grid can be used to charge a first battery cassette. Grid power from the power grid can supplement any charging provided by the secondary power sources in block 913. The energy from the power grid can be used to provide supplemental power to compensate for the forecasted energy deficit for the battery cassette being charged. The grid power can be provided with the determined charging current until the charging threshold is reached in block 919. For example, if the charging current for a first battery cassette is 0.1 A and the charging threshold is 1 hour, then 0.1 A of grid current can be used to charge a first battery cassette for 1 hour in addition to a variable amount of current from the secondary power sources during the same time period. In another example, if the charging current for a first battery cassette is 0.1 A and the charging threshold is 1 hour, then 0.1 A of grid current can be used to charge a first battery cassette for 1 hour in addition to a variable amount of current from the secondary power sources during the same time period.

At block 919, the charging threshold can be reached for a battery cassette, such as a first battery cassette. The charging threshold can be determined at block 909. For example, the first battery cassette can have charged for a time duration, charged with a quantity of energy, changed to a certain voltage, and the like.

At block 921, one or more of blocks 917-919 can be repeated for other battery cassettes, for example, battery cassettes other than the first battery cassette. Block 921 can be repeated to select a next battery cassette according to a series order. For example, for a system with four battery cassettes, a first battery cassette can be charged according to blocks 917 and 919, then a second battery cassette can be charged according to blocks 917 and 919, then a third battery cassette can be charged according to blocks 917 and 919, and then a fourth battery cassette can be charged according to blocks 917 and 919 completing a charging cycle for the four battery cassettes. All the while, the four battery cassettes can be charged from the secondary power sources whenever available at block 913. In some embodiments, one or more of the blocks 917-921 can be performed in parallel.

At block 923, the charging of the battery cassettes according to blocks 917-921 can be optionally repeated any number of times over a time period before preceding to balancing at block 933. For example, in a system with four battery cassettes, each of the battery cassettes can be charged for 1 hour each at blocks 917-921 during a charging cycle, and the charging cycles can be repeated five times at block 923 for a total of 20 hours before proceeding to balance the battery cassettes for the remaining four hours of a 24 hour period. In another embodiment, blocks 917-92 can be performed once without repeating at block 923 over the time span of one minute before preceding to balancing the battery cassettes.

At block 925, the battery cassette parameters can be measured. The parameters can be similar to those measured at block 907. The parameters can include voltages of the battery cassettes, which indicates states of charge of the battery cassettes. The parameters can also include current provided to the battery cassettes. In some embodiments, the current can be measured and summed or integrated over time to determine a total quantity of current or energy provided to each battery cassette as a battery cassette is charged. Accordingly, block 925 can be performed in parallel with charging a battery cassette.

At block 927, imbalances in states of charge of the battery cassettes can be determined. The imbalances can be caused, for example, by inaccurate forecasts of energy use or energy generation, by degraded batteries, or other factors. Accordingly, a battery cassette may have been charged with more or less energy than the forecasted, the actual energy deficit can be higher or lower than forecasted, and the battery cassette can end up with a state of charge that is too high or too low in comparison to a target state of charge. For example, if a battery cassette was charged in block 915 based on various forecasts and is expected to have 80% capacity but has only 75% capacity after charging, then the battery cassette can be considered 5% imbalanced. Accordingly, the battery cassette imbalances can be measured against an expected state of charge. Additionally or alternatively, a battery cassette can also be imbalanced in comparison to other battery cassettes. For example, if a first battery cassette is measured at 23.5 V and a second battery cassette is measured at 23.1 V, and both of the two battery cassettes normally provide 24.0 V when fully charged, then the second battery cassette can be considered imbalanced by 0.4 V in comparison to the first battery cassette. As another example, if a first battery cassette has 2 kWh less energy than expected and a second battery cassette has 1 kWh energy than expected, then the first energy cassette can be determined to be more imbalanced than the second battery cassette.

At block 931, balancing thresholds can be determined based at least in part on the battery imbalances for each battery cassette to reduce or eliminate the imbalances. The balancing thresholds can include parameters for charging a battery cassette, such as an energy quantity, voltage, and/or duration. For example, a balancing threshold for a battery cassette that used 1 kWh more energy than forecasted and received 2 kWh less energy than forecasted from secondary sources can be balanced by receiving 3 kWh of energy. As another example, a battery cassette expected to be at 23.5 V after a day of charging and usage but is actually at 23.2 V can be charged until the voltage of the battery cassette reaches 23.5 V.

At block 933, the battery cassettes can be can be balanced. Block 933 can include blocks 935-945. The example embodiment described in block 933 can be implemented using the technology described with respect to FIGS. 3A and/or 3B. Other examples of balancing battery cassettes can include balancing sequentially balancing individual battery cassettes.

At block 935, a first pair of battery cassettes can be charged with a balancing current to at least partially balance the battery cassettes in the first pair. The battery cassettes can be charged with power from any power source such as the grid, secondary power generators, or other battery cassettes.

For example, in FIG. 3B, switches SWB and SWAB can be closed while the other switches are open. The battery cassettes A and B can be charged until a balancing threshold for battery B is reached.

The balancing current can be determined and selected for each battery cassette to sufficiently balance each respective battery cassette within a time period allocated for balancing each battery cassette. The balancing current can be supplied from the grid, secondary energy sources if the secondary energy sources are available, and/or other battery cassettes that are overcharged or have lesser actual energy deficits.

At block 937, the first balancing threshold can be reached for a first battery cassette of the pair. When the system of FIG. 3B is used in conjunction with the inverter 111 of FIG. 5, battery cassette B uses less energy over each sinusoidal period than battery cassette A, so the balancing threshold for battery cassette B can be reached before reaching the balancing threshold for battery cassette A. Example charging thresholds for battery cassette B can include reaching a first voltage, charging for a first duration, and/or charging with a first quantity of energy.

At block 939, charging of the first battery cassette can be stopped. For example, with respect to FIG. 3B, switches $SW_A$ and SWAB can be closed while the other switches are open to continue charging battery cassette A without charging battery cassette B.

At block 941, the charging threshold for the second battery cassette of the pair can be reached. Example charging thresholds for battery cassette A can include reaching the first voltage or a second voltage, charging for a second duration, charging with a second quantity of energy, and/or reaching a threshold voltage within the voltage of battery cassette B. In some embodiments, charging thresholds are different for different battery cassettes. For example, the charging threshold for battery cassette B can be to reach a set voltage (such as 11.90 V) or state of charge (such as 90%) while the charging threshold for battery A can be to reach within a threshold voltage (such as 25 mV, 50 mV and the like) of a present voltage of battery cassette B.

At block 943, charging of the first pair of battery cassettes can be stopped, and a next pair of battery cassettes can be balanced as described with respect to blocks 935-941. Block 943 can be repeated for each pair of battery cassettes in a storage system. For example, if FIG. 3B can include battery cassettes A-D, then block 943 can include repeating blocks 935-941 for blocks C and D.

At block 945, balancing of all battery cassettes can be repeated over a time period. The balancing can be repeated any number of times. For example, instead if four hours are allocated for balancing four pairs of battery cassettes, each pair of battery cassettes can be charged and balanced for one hour each without repeating at block 945. In another example, if four hours are allocated for balancing four pairs of battery cassettes, each pair of battery cassettes can be charged and balanced for 30 minutes each, and the balancing process can be repeated once.

In other embodiments, battery cassettes can be sequentially selected for balancing instead of balancing pairs or balanced in quantities of three or more. In some embodiments, more imbalanced battery cassettes can be balanced using energy from less imbalanced battery cassettes. For example, if a first battery cassette has 2 kWh less energy than expected and a second battery cassette has 1 kWh energy than expected, then the first energy cassette can be balanced with energy from the second battery cassette until both battery cassettes are 1.5 kWh below an expected energy level. If any battery cassette has a greater than expected state of charge, then that battery cassette can be used to provide energy to battery cassettes with a lower than expected state of charge.

Figure 10:
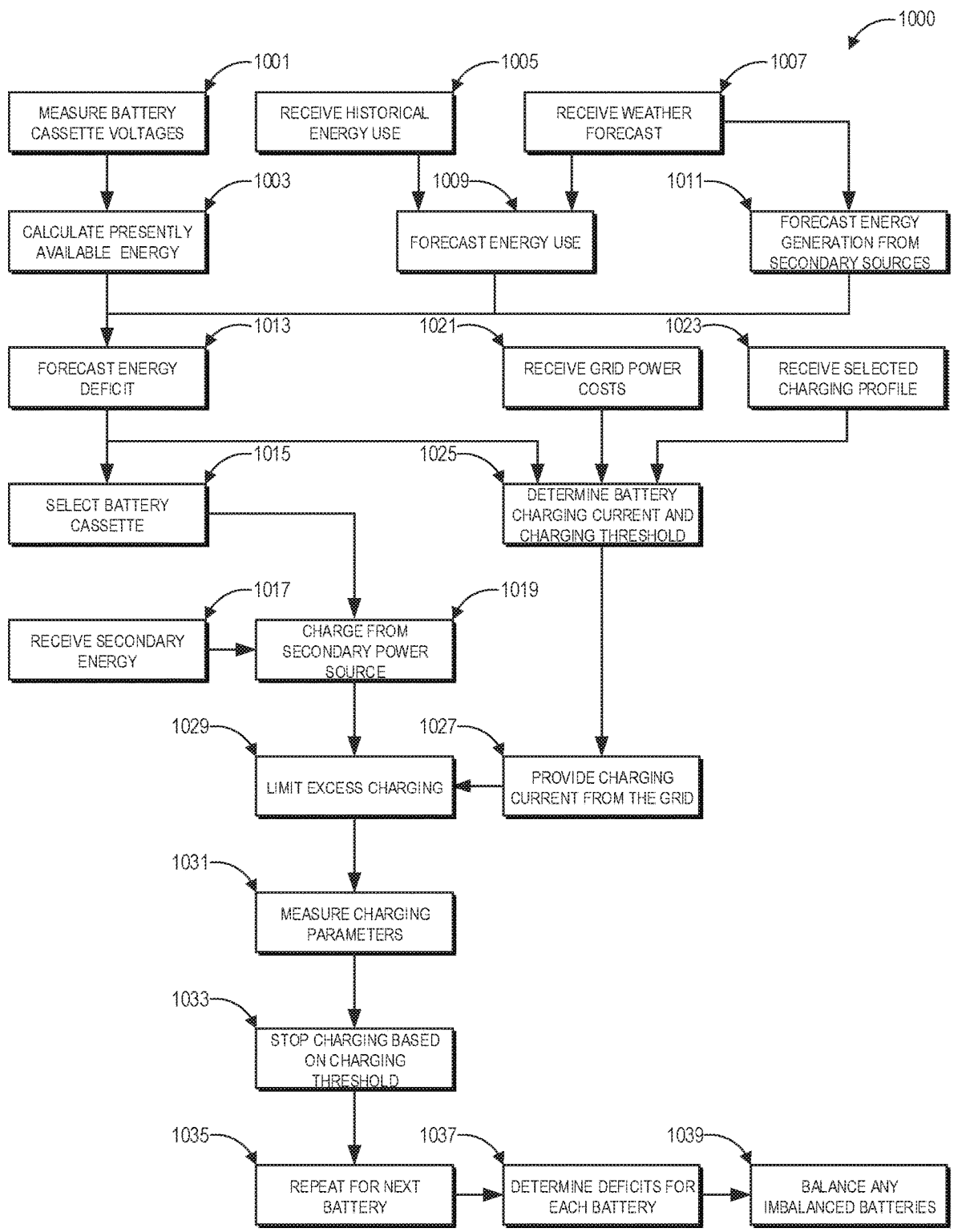
FIG. 10 shows an example flowchart for managing battery charging according to certain embodiments.

FIG. 10 shows an embodiment of an example flowchart for managing battery charging. At block 1001, voltages of the battery cassettes can be measured. The voltages can be measured to determine a state of charge of each battery cassette. In some embodiments, a no-load voltage can be measured to deter the state of charge of each battery cassette.

At block 1003, a presently available energy of each battery cassette can be determined. A presently available energy can be compared to an expected energy, and the result of the comparison can factor into the energy deficit forecast in block 1013. For example, a battery cassette may start a day (or any other time period) by having a greater than normal state of charge if a less than predicted amount of energy was used during a previous time period. The excess energy can reduce the forecasted energy deficit.

At block 1005, an indication of historical energy use can be received. For example, indicators of historical energy use can be retrieved from a database, retrieved from a memory, received as user input, received as data transmitted over a network, or received from other sources. The indicators of historical energy use can include actual dynamic energy use, average energy uses over periods of time, indicators of dates and times of quantities of energy used, or other statistics of historical energy used. In some embodiments, a controller such as controller 117 of FIG. 1 receives the indicator of historical energy use.

At block 1007, a weather forecast can be received. For example, the weather forecast can be received by a controller such as the controller 117 of FIG. 1 through the network 125. The weather forecast can include one, all, or any combination of: a temperature forecast, a cloudiness indicator, an insolation forecast, a wind forecast, or other forecasts.

At block 1009, the weather forecast and/or historical energy use can be used to forecast an energy use over a period of time. The forecasted energy use can be based on the historical energy use for similar times or days and be adjusted to account for weather conditions that may require air conditioning or heating.

At block 1011, the weather forecast can also be used to forecast a quantity of energy that will be generated from secondary energy sources over the period of time. The forecasted energy generated by secondary power sources can be determined based on historical energy generation of available secondary power sources and on parts of the weather forecast.

At block 1013, an energy deficit can be forecasted for the period of time. The energy deficit can be based on a difference between the forecasted energy use and the forecasted energy generated from secondary energy sources. In some embodiments, the energy deficit can also account for a surplus or deficiency of energy available in the battery cassettes that may have accumulated from a previous time period.

At block 1015, a battery cassette can be selected. In some embodiments, a battery cassette with a greatest energy deficit can be selected for charging. In some embodiments, battery cassettes can be sequentially selected for charging.

At block 1017, secondary energy from the secondary power sources can be received. At block 1019, the secondary energy can be used to charge the selected battery cassette. At block 1021, power grid costs can be received.

At block 1023, a selected charging profile can be received. The selected charging profile can be configured by a user, selected from among a plurality of charging profiles, or otherwise selected. In some examples, the charging profile can be selected by receiving indications of which factors to apply in what weightings to determine charging currents. For example, a charging profile may select a constant charging current such as line 753 of FIG. 7, a dynamic current that adjusts based on an energy prices such as line 751 of FIG. 7, a particular current-voltage charging profile such as shown by profile 800 of FIG. 8, or a profile determined based on a weighted combination of various factors.

At block 1025, a battery charging current and a charging threshold can be determined. The charging current for each battery cassette can be determined based on the forecasted energy deficit from block 1013 for each battery cassette in order to provide an approximately equal quantity of energy or a sufficient quantity of energy to compensate for the forecasted energy deficit given the duration that the charging current will be provided to the battery cassette. The charging current can also be determined based on the selected charging profile and power grid costs. The charging current can also be determined based on other factors discussed herein. The charging threshold can include one or more of: quantity of time for charging a battery cassette, a quantity of energy for charging a battery cassette, a voltage or state of charge, or other threshold.

At block 1027, the charging current can be provided from the grid to the selected battery cassette.

At block 1029, excess charging can be limited. The charging can be limited, for example, if a battery or battery cassette overheats. The charging can also be limited, for example based on a present voltage of the battery cassette and a current-voltage profile, such as shown in FIG. 8. For example, if a current from the secondary power source, a current from the grid, or a sum of the currents form the secondary power source and the grid exceeds the charging current specified in the charging profile, then the charging current can be limited as specified in the current-voltage profile.

At block 1031, the charging parameters can be measured. The charging parameters can include how much energy has been provided to the selected battery cassette, how long a battery cassette has been charged, a state of charge of the battery cassette, or any other parameter that may relate to the charging threshold. The selected battery cassette can be charged until the charging threshold is reached.

At block 1033, charging of the selected battery cassette can be stopped based on reaching the charging threshold.

At block 1035, blocks 1001-1033 or a subset thereof can be repeated, including selection of a next battery cassette at block 1015. The blocks 1001-1033 or a subset thereof can be repeated for at least all battery cassettes. In some embodiments, some measurements, forecasts, or actions of blocks 1001-1033 can be performed in parallel instead of sequentially. Blocks 1001-1033 can be additionally be repeated for any number of charging cycles.

At block 1037, actual deficits for each battery cassette can be determined. At block 1039, if the actual deficits are imbalanced, then the battery cassettes can be balanced to reduce, eliminate, or equalize the actual deficits across the battery cassettes.

Figure 11:
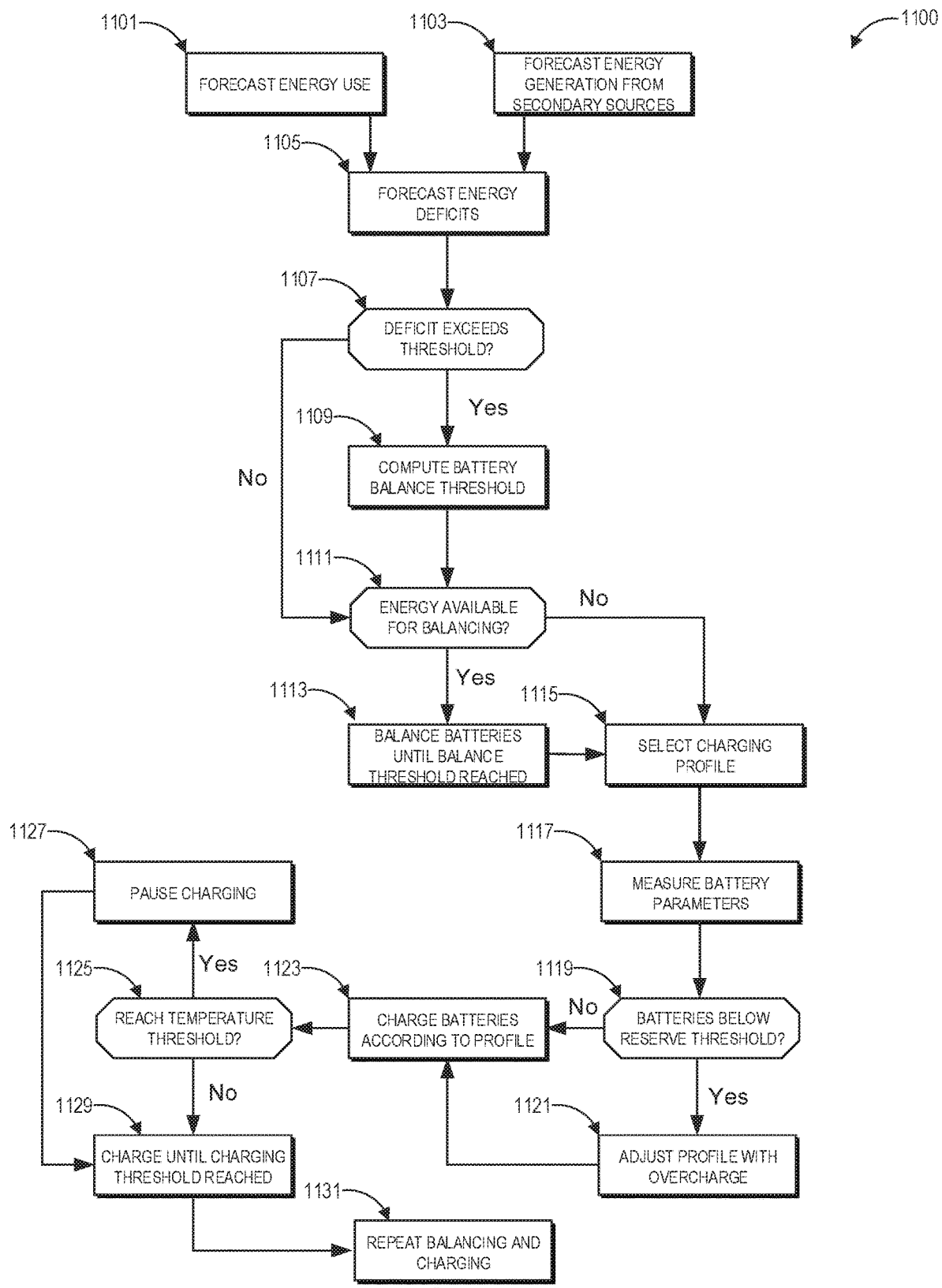
FIG. 11 shows an example flowchart for balancing and charging battery cassettes according to certain embodiments.

FIG. 11 shows an embodiment of an example flowchart 1100 for balancing and charging battery cassettes. At block 1101, energy use can be forecasted. At block 1103, energy generation from secondary sources can be forecasted. At block 1105, an energy deficit can be forecasted based on the forecasted energy use and the forecasted energy generation.

At block 1107, if a forecasted energy deficit for a battery cassette exceeds a deficit threshold, then a battery balance threshold can be computed at block 1109. Computing the battery balance threshold can include determining an amount of energy to provide to the battery cassette, a duration of time to charge the battery cassette, or other threshold. At block 1111, it can be determined if energy is available for balancing. Energy can be available from the grid, from another battery cassette, or from secondary energy sources.

If energy is available for balancing, then at block 1113, the state of charge of battery cassettes can be balanced until the balance threshold is reached. Two battery cassettes of equal capacity and voltage ratings can be considered balanced, for example, if their voltages are equal or within a threshold of each other, such as within 50 mV of each other. The balance threshold can be set, for example at 10 mV, 25 mV, 100 mV or other threshold based on the battery ratings and other considerations. A lower voltage battery cassette can be charged until the battery cassette's voltage raises to a quantity that is within the balance threshold in comparison to the other battery cassette. In general, a voltage proportionally indicates a state of charge of a battery.

At block 1115, a charging profile can be selected. At block 1117, parameters of the battery cassettes can be measured. The parameters can include, for example, a voltage or state of charge of a battery cassette, a temperature of a battery cassette, or other battery parameters. In some embodiments, a voltage of a battery cassette can be measured when no current is drawn from the battery while the battery is used to generate a sinusoidal output waveform. This can include sampling the voltage at or around a zero crossing of the sinusoidal output waveform.

At block 1119, based on the battery parameters, it can be determined if a state of charge of a battery is less than a reserve threshold, such as 10%, 30%, 2 kWh, 1 kWh, or other reserve threshold. If so, then at block 1121, a profile of the battery cassette can be configured for an overcharge, such as with a higher current, charging for a longer duration, or other adjustment for providing additional energy to the battery cassette.

At block 1123, the battery cassettes can be charged according to their respective charging profiles, which may include the overcharge adjustments determined at block 1121 if applicable. At block 1125, it can be determined if a battery temperature exceeds a threshold. If so, then at block 1127, charging can be paused.

At block 1129, the battery cassette can be charged until a charging threshold is reached. At block 1131, the balancing and charging cycles of blocks 1101-1129 or a subset thereof can be repeated for other battery cassettes. In some embodiments, some of the blocks 1101-1129 can be performed in parallel for other battery cassettes.

Figure 12:
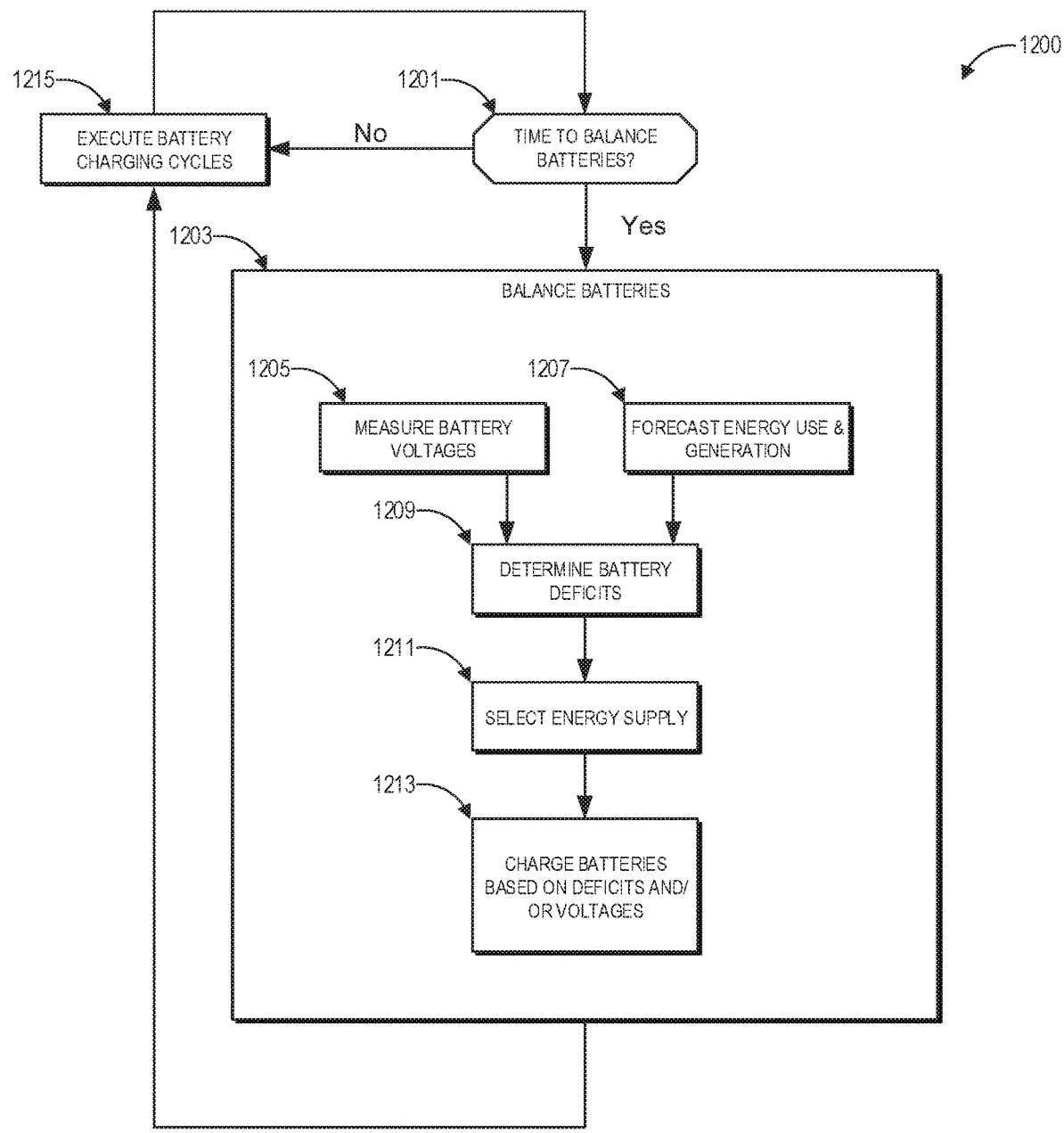
FIG. 12 shows a flowchart for balancing and charging battery cassettes according to certain embodiments.

FIG. 12 shows an embodiment of an example flowchart 1200 for balancing and charging battery cassettes. At block 1201, it can be determined if it is time to balance the state of charges of the battery cassettes. In various embodiments, the states of charge of the battery cassettes can be balanced periodically, intermittently, after a certain amount of energy has been used or generated, or based on other factors. In various other embodiments, the states of charge of the battery cassettes can be balanced when the magnitude of the imbalance exceeds a threshold.

At block 1203, the states of charge of the battery cassettes can be balanced, which can include blocks 1205-1213. Balancing can be repeated for each battery cassette. At block

1205, voltages of the battery cassettes can be measured. The voltages can indicate states of charge of the battery cassettes.

At block 1207, energy uses of the battery cassettes and energy generation for the battery cassettes can be forecasted. At block 1209, energy deficits of the battery cassettes can be determined. At block 1211, an energy supply can be selected. The energy supply can be selected from the grid, the secondary power source, a battery cassette having a greater state of charge (either proportionally or absolutely), and/or a battery cassette having a lesser deficit.

At block 1213, a state of charge of a battery cassette can be charged with energy from the selected energy supply. The battery cassette can have a greater energy deficit, lower state or charge, or combination of a greater energy deficit and lower state of charge than other battery cassettes. The battery cassette can be charged until a state of charge of the battery cassette reaches a threshold, a threshold amount of time has passed, or a quantity of energy has charged the battery cassette. The thresholds can be a quantity or difference in comparison to states of charge and/or deficits other battery cassettes.

After the battery cassettes are balanced, one or more battery charging cycles can be performed at block 1215 until the time to balance battery cassettes occurs again at block 1201.

In some embodiments, pairs of battery cassettes can be sequentially selected for balancing at the same time, and a first battery cassette of the pair of battery cassettes can stop balancing once a first balancing threshold is reached while second battery cassette of the pair of battery cassettes can continue charging until a second balancing threshold is reached.

In some embodiments, the battery cassettes can be individually, sequentially selected for balancing. In some embodiments, battery cassettes with greater energy deficits can be sequentially selected for balancing until a balancing threshold is reached or until more balanced than other battery cassettes.

Additional Details

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices such as the controller 117 of FIG. 1. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "controllers," "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 13:
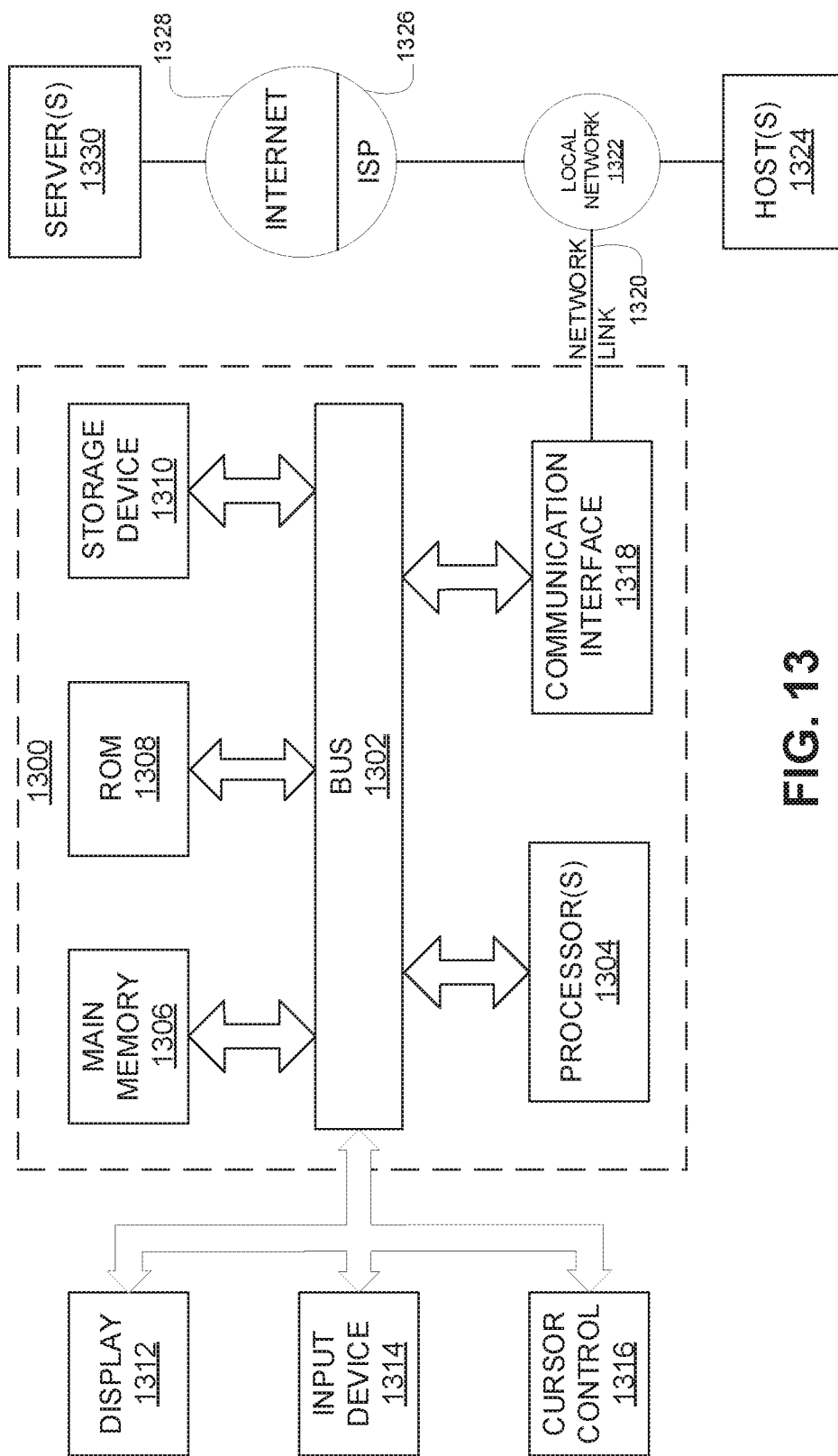
FIG. 13 is a block diagram that illustrates a controller system upon which various embodiments may be implemented.

For example, FIG. 13 is a block diagram that illustrates a controller system 1300 upon which various embodiments may be implemented. For example, the controller 117 of Figure can be implemented as shown and described with respect to FIG. 13. Controller system 1300 can include a bus 1302 or other communication mechanism for communicating information, and a hardware processor, or multiple processors, 1304 coupled with bus 1302 for processing information. Hardware processor(s) 1304 may be, for example, one or more general purpose microprocessors.

Controller system 1300 also can include a main memory 1306, such as a random access memory (RAM), cache and/or other dynamic storage devices, coupled to bus 1302 for storing information and instructions to be executed by processor 1304. Main memory 1306 also may be used for storing temporary variables or other intermediate information during execution of instructions to be executed by processor 1304. Such instructions, when stored in storage media accessible to processor 1304, render controller system 1300 into a special-purpose machine that is customized to perform the operations specified in the instructions.

Controller system 1300 further can include a read only memory (ROM) 1308 or other static storage device coupled to bus 1302 for storing static information and instructions for processor 1304. A storage device 1310, such as a magnetic disk, optical disk, or USB thumb drive (Flash drive), etc., is provided and coupled to bus 1302 for storing information and instructions.

Controller system 1300 may be coupled via bus 1302 to a display 1312, such as a cathode ray tube (CRT) or LCD display (or touch screen), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane. In some embodiments, the same direction information and command selections as cursor control may be implemented via receiving touches on a touch screen without a cursor.

Controller system 1300 can include a user interface module to implement a GUI that may be stored in a mass storage device as computer executable program instructions that are executed by the computing device(s). Controller system 1300 may further, as described below, implement the techniques described herein using customized hard-wired logic, one or more ASICs or FPGAs, firmware and/or program logic which in combination with the controller system causes or programs controller system 1300 to be a special-purpose machine. According to one embodiment, the techniques herein are performed by controller system 1300 in response to processor(s) 1304 executing one or more sequences of one or more computer readable program instructions contained in main memory 1306. Such instructions may be read into main memory 1306 from another storage medium, such as storage device 1310. Execution of the sequences of instructions contained in main memory 1306 causes processor(s) 1304 to perform the process steps described herein. In alternative embodiments, hard-wired circuitry may be used in place of or in combination with software instructions.

Various forms of computer readable storage media may be involved in carrying one or more sequences of one or more computer readable program instructions to processor 1304 for execution. For example, the instructions may initially be carried on a magnetic disk or solid state drive of a remote computer. The remote computer can load the instructions into its dynamic memory and send the instructions over a telephone line using a modem. A modem local to controller system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Controller system 1300 also can include a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN (or WAN component to communicate with a WAN). Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from controller system 1300, are example forms of transmission media.

Controller system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

As described above, in various embodiments certain functionality may be accessible by a user through a web-based viewer (such as a web browser), or other suitable software program). In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure can include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily can include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for intelligently managing battery cassettes, the system comprising:

a plurality of battery cassettes coupled in series;

a control system including a controller, the control system configured to control charging of the plurality of battery cassettes and balancing of states of charge of pairs of battery cassettes of the plurality of battery cassettes; and a plurality of switches controlled by the control system to selectively couple the plurality of battery cassettes to a power grid;

wherein said charging of the plurality of battery cassettes includes:
  selecting, from among the plurality of battery cassettes, at least one selected battery cassette;
  calculating a forecasted energy deficit for the at least one selected battery cassette;
  determining a charging current for the at least one selected battery cassette based at least in part on the forecasted energy deficit; and
  charging the at least one selected battery cassette with a grid current from a power grid, wherein the grid current provided is controlled based at least in part on the charging current;

wherein each pair of battery cassettes includes a first battery cassette and a second battery cassette; and wherein said balancing the states of charge of pairs of battery cassettes of the plurality of battery cassettes includes, for each pair of battery cassettes:
  measuring a first state of charge of the first battery cassette and a second state of charge of the second battery cassette included in the pair of battery cassettes;
  determining a first actual energy deficit of the first battery cassette and a second actual energy deficit of the second battery cassette, wherein the first actual energy deficit is greater than the second actual energy deficit;
  providing a balancing current to the first battery cassette and the second battery cassette;
  determining that the second state of charge of the second battery cassette reaches a first balancing threshold;
  stopping the balancing current from being provided to the second battery cassette in response to the determination that the second state of charge of the second battery cassette reaches the first balancing threshold; and
  providing the balancing current to the first battery cassette until the first state of charge of the first battery cassette reaches a second balancing threshold; and wherein the plurality of battery cassettes are electrically coupled to an active load during the charging of the at least one selected battery cassette and during the providing of the balancing current to the first battery cassette and the second battery cassette.

2. The system of claim 1, wherein said charging of the at least one selected battery cassette includes charging the at least one selected battery cassette with the grid current from the power grid and with a secondary current from a secondary energy source, wherein the grid current provided to the at least one selected battery cassette is controlled based at least in part on the charging current and the secondary current.

3. The system of claim 1, wherein during balancing, the first battery cassette is charged from at least one of: a secondary energy source or the second battery cassette.

4. The system of claim 1 further comprising a secondary energy source coupled to the plurality of battery cassettes, wherein:
the secondary energy source includes at least one of: a solar panel, a wind turbine, a geothermal generator, fuel cell, or a combustion powered generator; and
the second energy source is located on a same or adjacent property as the active load that draws power from the plurality of battery cassettes.

5. The system of claim 1, wherein:
the battery cassettes of the plurality of battery cassettes have voltage capacities that are different from each other; and
the battery cassettes of the plurality of battery cassettes have energy capacities that are different from each other.

6. The system of claim 1, further comprising:
a rectifier configured to rectify the grid current; and
a voltage to current converter configured to set, based at least in part on the charging current, an amperage of the grid current being provided to the plurality of battery cassettes; and
wherein the control system is further configured to direct the grid current to bypass the rectifier and the voltage to current converter during a failsafe mode or when the plurality of battery cassettes have less than a threshold amount of total energy.

7. The system of claim 1, wherein calculating the forecasted energy deficit for the at least one selected battery cassette includes:
receiving a weather forecast;
accessing a predicted energy use for the at least one selected battery cassette, wherein the predicted energy use is based at least in part on the weather forecast and a historical energy use of the at least one selected battery cassette when coupled to an inverter configured to use the at least one selected battery cassette according to a modulation scheme;
determining a predicted quantity of secondary energy available based at least in part on the weather forecast; and
calculating a difference between the predicted quantity of secondary energy available and the predicted energy use.

8. The system of claim 1, wherein the charging current is determined at least in part on the forecasted energy deficit and at least one of: a price of grid power, a profile specifying charging currents for different voltages of a particular battery cassette, a request to charge at a specified current, or a request to charge with a specified power.

9. A system for intelligently managing battery cassettes, the system comprising:
a control system including a controller, the control system configured to control charging of a plurality of battery cassettes coupled in series, wherein each pair of battery cassettes includes a first battery cassette and a second battery cassette, and the control system is further configured to balancing of balance the states of charge of pairs of battery cassettes of the plurality of battery cassettes by, for each pair of battery cassettes:
measuring a first state of charge of the first battery cassette and a second state of charge of the second battery cassette included in the pair of battery cassettes;
determining a first actual energy deficit of the first battery cassette and a second actual energy deficit of the second battery cassette, wherein the first actual energy deficit is greater than the second actual energy deficit;
providing a balancing current to the first battery cassette and the second battery cassette;
determining that the second state of charge of the second battery cassette reaches a first balancing threshold;
stopping the balancing current from being provided to the second battery cassette in response to the determination that the second state of charge of the second battery cassette reaches the first balancing threshold; and
providing the balancing current to the first battery cassette until the first state of charge of the first battery cassette reaches a second balancing threshold; and
a plurality of switches controlled by the control system to selectively couple the plurality of battery cassettes to a power grid;
wherein the plurality of battery cassettes are electrically coupled to an active load during charging of the plurality of battery cassettes and during balancing states of charge of pairs of battery cassettes of the plurality of battery cassettes.

10. The system of claim 9 wherein the control system is further configured to charge the plurality of battery cassettes by:
selecting, from among the plurality of battery cassettes, at least one selected battery cassette;
calculating a forecasted energy deficit for the at least one selected battery cassette;
determining a charging current for the at least one selected battery cassette based at least in part on the forecasted energy deficit; and
charging the at least one selected battery cassette with a grid current from a power grid, wherein the grid current provided is controlled based at least in part on the charging current.

11. The system of claim 9 wherein the plurality of switches comprises a plurality of first switches, each first switch of the plurality of first switches associated with a respective battery cassette of the plurality of battery cassettes and in electrical communication with a positive terminal of the respective battery cassette; and wherein the controller is in electrical communication with the plurality of first switches to provide charging current to each battery cassette via the respective first switch, the controller providing control signals to control a state of the plurality of first switches, the controller comprising one or more processors programmed to execute instructions that cause at least one processor of the one or more processors to:
close the first switches associated with a first battery cassette and a second battery cassette of a first pair of battery cassettes;
determine that the first battery cassette of the first pair has reached a battery charging threshold and that the second battery cassette of the pair has not reached the charging threshold; and
open the first switch associated with the first battery cassette to continue to charge the second battery cassette until the second battery reaches the charging threshold to balance charges of the first battery cassette and the second battery cassette.

12. The system of claim 11 wherein the plurality of switches further comprises a plurality of second switches, each second switch of the plurality of second switches associated with a respective pair of battery cassettes and in electrical communication with a negative terminal of the respective pair of battery cassettes.

13. The system of claim 12 wherein the controller further provides the control signals to control a state of the plurality of second switches, the controller comprising the one or more processors programmed to execute instructions that further cause the at least one processor of the one or more processors to close the second switch associated with the first pair of battery cassettes to charge the first and second battery cassettes of the first pair of battery cassettes.

14. The system of claim 11 further comprising a plurality of voltage sensors, each voltage sensor of the plurality of voltage sensors associated with the respective battery cassette to determine a state of charge of the respective battery cassette.

15. The system of claim 14 wherein the state of charge is used to determine energy deficits of the respective battery cassette.

16. The system of claim 14 wherein the state of charge is used to determine whether to rebalance each respective battery cassette.

17. The system of claim 14 wherein the state of charge is used to log historical energy use.

18. The system of claim 11 further comprising at least one temperature sensor to measure a temperature of each respective battery cassette.

19. The system of claim 18 wherein the controller interrupts charging of each respective battery cassette based on the measured temperature of each respective battery cassette.

* * * * *

UNITED STATES PATENT AND TRADEMARK OFFICE
CERTIFICATE OF CORRECTION

| | | |
|---|---|---|
| PATENT NO. | : 10,615,610 B1 | Page 1 of 1 |
| APPLICATION NO. | : 16/423822 | |
| DATED | : April 7, 2020 | |
| INVENTOR(S) | : Howard John Jelinek | |

It is certified that error appears in the above-identified patent and that said Letters Patent is hereby corrected as shown below:

In the Drawings

On Sheet 9 of 14, FIG. 8, Reference Number 850, Line 5 (Approx.), delete "Use Use" and insert --Use--.

In the Specification

In Column 14, Line 22, delete "Internet." and insert --internet.--.

In Column 18, Line 65, delete "$S_1$" and insert --$S_I$--.

In Column 19, Line 10 (Approx.), delete "$S_1$" and insert --$S_I$--.

In Column 19, Line 15 (Approx.), delete "$S_1$" and insert --$S_I$--.

In Column 24, Line 64, delete "nighttime" and insert --night time--.

In Column 40, Line 37, delete "program)." and insert --program.--.

In the Claims

In Column 43, Line 58, Claim 9, delete "and the" and insert --the--.

In Column 43, Line 59, Claim 9, delete "to balancing of" and insert --to--.

Signed and Sealed this
Twenty-second Day of September, 2020

Andrei Iancu
*Director of the United States Patent and Trademark Office*